United States Patent
Rönneke et al.

(10) Patent No.: US 11,937,326 B2
(45) Date of Patent: Mar. 19, 2024

(54) USER EQUIPMENT (UE) REACHABILITY REQUEST PARAMETER FOR SUSPENDED RADIO ACCESS NETWORK (RAN)

(71) Applicant: Telefonaktiebolaget LM Ericsson (publ), Stockholm (SE)

(72) Inventors: Hans Bertil Rönneke, Kungsbacka (SE); Qian Chen, Mölndal (SE); Mikael Wass, Sätila (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 17/277,653

(22) PCT Filed: Sep. 24, 2019

(86) PCT No.: PCT/EP2019/075705
§ 371 (c)(1),
(2) Date: Mar. 18, 2021

(87) PCT Pub. No.: WO2020/064726
PCT Pub. Date: Apr. 2, 2020

(65) Prior Publication Data
US 2022/0015181 A1    Jan. 13, 2022

Related U.S. Application Data

(60) Provisional application No. 62/735,515, filed on Sep. 24, 2018.

(51) Int. Cl.
*H04W 76/27* (2018.01)
*H04W 76/30* (2018.01)

(52) U.S. Cl.
CPC ........... *H04W 76/27* (2018.02); *H04W 76/30* (2018.02)

(58) Field of Classification Search
CPC .............................. H04W 76/27; H04W 76/30
See application file for complete search history.

(56) References Cited

U.S. PATENT DOCUMENTS

2019/0059067 A1*  2/2019  Lee ........................ H04W 28/10
2019/0104564 A1*  4/2019  Johansson ........... H04W 74/008
(Continued)

OTHER PUBLICATIONS

International Search Report and Written Opinion of the International Searching Authority, PCT/EP2019/075705, dated Dec. 20, 2019, 11 pages.
(Continued)

*Primary Examiner* — Zhiren Qin
(74) *Attorney, Agent, or Firm* — Sage Patent Group

(57) ABSTRACT

Disclosed herein is a method for operating a radio access network (RAN) node of a wireless communication network. The method comprises: receiving a connection resume request message from a wireless terminal at the RAN node instructing the RAN node to establish a connection with the wireless terminal; providing release information for the wireless terminal at the RAN node; determining a state of a reachability request parameter at the RAN node; receiving uplink data from the wireless terminal at the RAN node, wherein the uplink data is associated with the connection resume request message; and transmitting a connection release message to the wireless terminal after receiving the uplink data responsive to the release information for the wireless terminal and determining the state of a reachability request parameter at the RAN node, wherein responsive to the state of the reachability request parameter at the RAN node having a first state, instructing the RAN node to not immediately transmit a connection release message to release and/or suspend the connection with the wireless terminal.

16 Claims, 13 Drawing Sheets

(56) References Cited

U.S. PATENT DOCUMENTS

| | | | | |
|---|---|---|---|---|
| 2019/0124711 A1* | 4/2019 | Dai | .................. | H04W 76/18 |
| 2019/0141515 A1* | 5/2019 | Kim | .................. | H04W 8/08 |
| 2019/0350037 A1* | 11/2019 | Lee | .................. | H04W 52/0229 |
| 2020/0128443 A1* | 4/2020 | Na | .................. | H04W 76/27 |
| 2020/0178209 A1* | 6/2020 | Jin | .................. | H04W 36/0055 |
| 2020/0351723 A1* | 11/2020 | Kim | .................. | H04W 36/08 |
| 2020/0383164 A1* | 12/2020 | Kim | .................. | H04W 76/12 |
| 2021/0289579 A1* | 9/2021 | Ke | .................. | H04W 36/08 |

OTHER PUBLICATIONS

Ericsson, "KI2 UE Power Efficiency Resolved," SA WG2 Meeting #129, S2-1811231 (revision of S2-1810212), Oct. 15-19, 2018, Dongguan, P.R. China (XP051540077) 19 pages.

Ericsson, "KI2 Pending DL Data at AS RAI," SA WG2 Meeting #129-Bis, S2-1811947 (revision of S2-1811132), Nov. 26-30, 2018, West Palm Beach, Florida, US (XP051563473) 15 pages.

"3rd Generation Partnership Project; Technical Specification Group Services and System Aspects; Study on Cellular IoT support and evolution for the 5G System (Release 16)" 3GPP TR 23.724 V1.0.0 (Sep. 2018) 234 pages.

"3rd Generation Partnership Project; Technical Specification Group Services and System Aspects; System Architecture for the 5G System; Stage 2 (Release 15)," 3GPP TS 23.501 V15.2.0 (Jun. 2018) 217 pages.

5G; Procedures for the 5G System (3GPP TS 23.502 version 15.2.0 Release 15) ETSI TS 123.502 V15.2.0 (Jun. 2018) 311 pages.

\* cited by examiner

USER EQUIPMENT (UE) REACHABILITY REQUEST PARAMETER FOR SUSPENDED RADIO ACCESS NETWORK (RAN)

CROSS REFERENCE TO RELATED APPLICATIONS

This application is a 35 U.S.C. § 371 national stage application of PCT International Application No. PCT/EP2019/075705 filed on Sep. 24, 2019, which in turns claims domestic priority to U.S. Provisional Patent Application No. 62/735,515, filed on Sep. 24, 2018, the disclosures and content of which are incorporated by reference herein in their entirety.

TECHNICAL FIELD

The present disclosure relates generally to communications, and more particularly, to wireless communications and related wireless devices and network nodes.

BACKGROUND

The 5th Generation 5G Cellular Internet of Things (CIoT) study in 3GPP SA2 (see, TR 23.724 V1.0.0, Reference [1]) provides a few User Plane (UP) changes, improvements, and/or optimizations for 5G CIoT. A few of these may use a wireless device user equipment (UE) context in the next-generation (NG) radio access network (RAN) (NG-RAN). For example, solution 19 (5G UP Optimization) and solution 7 (Small data frequent communication) in TR 23.724 V1.0.0 discuss using a UE context in the NG-RAN. At release of the Radio Resource Control (RRC) Connection, some conventional embodiments may not discard the UE context but may keep an Access Stratum (AS) context in the RAN and the UE. For solutions that do not keep any UE context in the NG-RAN (e.g., "normal" CM-IDLE), the UE context is only kept in the Access and Mobility Function AMF (and the UE).

Many CIoT devices may be power limited in that they may have limited and/or no access to an outside power source, and such devices may rely on a battery for power without recharging for long periods of time.

Accordingly, keeping the transmitter and/or the receiver on when communication is not occurring may reduce battery life.

SUMMARY

Certain aspects of the present disclosure and their embodiments provide improvements in connection with wireless devices, e.g. in connection with release of radio resources such as release of the Radio Resource Control (RRC) Connection.

One aspect of the present disclosure is directed to a method of operating a RAN node of a wireless communication network, the method comprising: receiving a connection resume request message from a wireless terminal at the RAN node instructing the RAN node to establish a connection with the wireless terminal; providing release information for the wireless terminal at the RAN node; determining a state of a reachability request parameter at the RAN node; receiving uplink data from the wireless terminal at the RAN node, wherein the uplink data is associated with the connection resume request message; and transmitting a connection release message to the wireless terminal after receiving the uplink data responsive to the release information for the wireless terminal and determining the state of a reachability request parameter at the RAN node, wherein responsive to the state of the reachability request parameter at the RAN node having a first state, instructing the RAN node to not immediately transmit a connection release message to release and/or suspend the connection with the wireless terminal.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
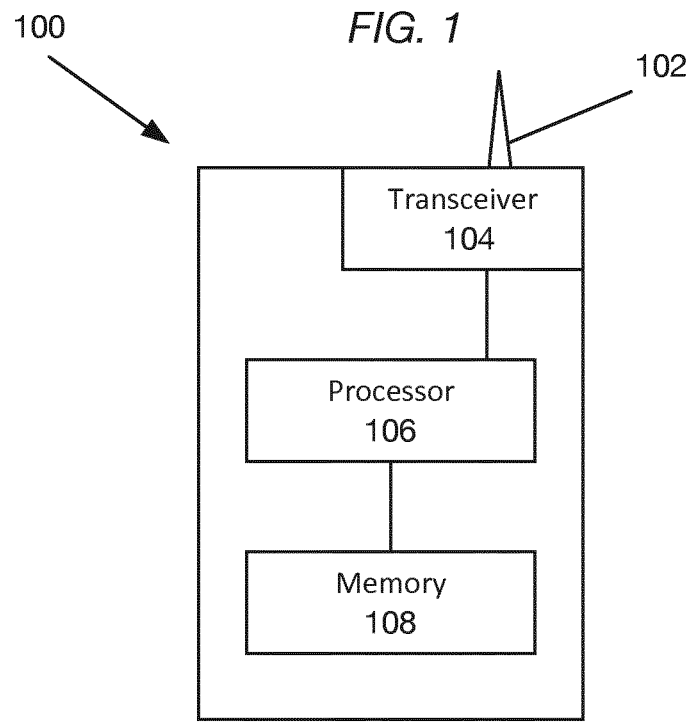
FIG. 1 is a block diagram illustrating a wireless device UE according to some embodiments of inventive concepts.

FIG. 1 is a block diagram illustrating elements of a wireless device UE 100 (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE 100 may include an antenna 102, and a transceiver circuit 104 (also referred to as a transceiver) including a transmitter and a receiver configured to provide uplink and downlink radio communications with a radio access network RAN node (e.g., a base station, eNB, gNB, etc.) of a wireless communication network. Wireless device UE 100 may also include a processor circuit 106 (also referred to as a processor) coupled to the transceiver circuit, and a memory circuit 108 (also referred to as memory) coupled to the processor circuit. The memory circuit 108 may include computer readable program code that when executed by the processor circuit 106 causes the processor circuit to perform operations according to embodiments disclosed herein. According to other embodiments, processor circuit 106 may be defined to include memory so that a separate memory circuit is not required. Wireless device UE 100 may also include an interface (such as a user interface) coupled with processor 106, and/or wireless device UE 100 may be an Internet of Things (loT) and/or a machine type communication (MTC) device.

As discussed herein, operations of wireless device UE 100 may be performed by processor 106 and/or transceiver 104. For example, processor 106 may control transceiver 104 to transmit uplink communications through transceiver 104 over a radio interface to a RAN node of a wireless communication network and/or to receive downlink communications through transceiver 104 from a RAN node of the wireless communication network over a radio interface. Moreover, modules may be stored in memory 108, and these modules may provide instructions so that when instructions of a module are executed by processor 106, processor 106 performs respective operations (e.g., operations discussed below with respect to example embodiments).

Figure 2:
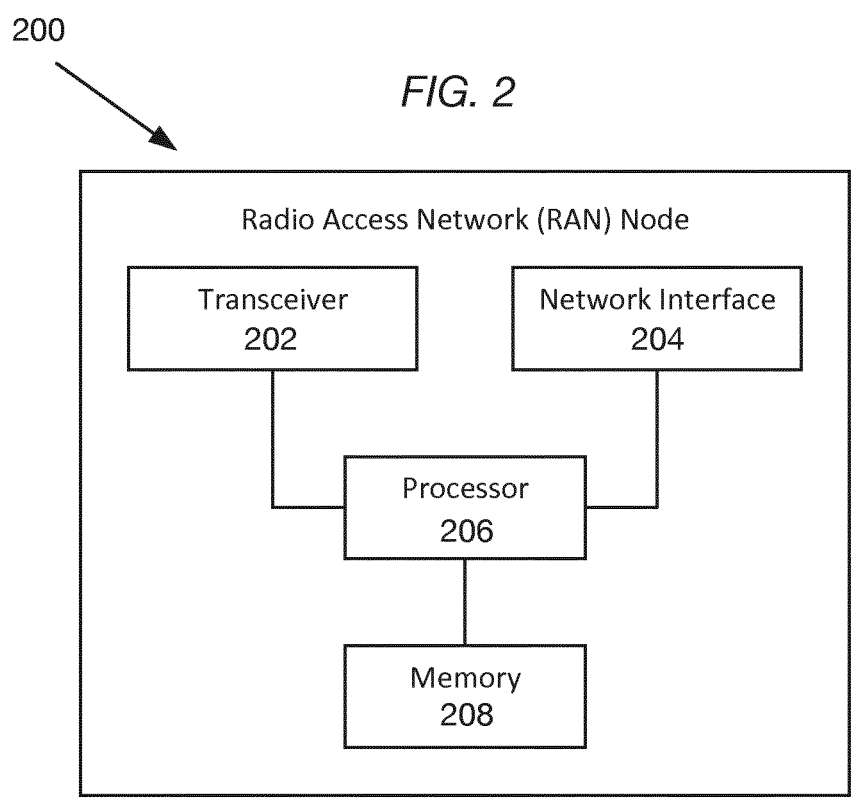
FIG. 2 is a block diagram illustrating a radio access network RAN node according to some embodiments of inventive concepts.

FIG. 2 is a block diagram illustrating elements of a radio access network RAN node 200 (also referred to as a network node, base station, eNB, eNodeB, gNB, gNodeB, etc.) of a wireless communication network configured to provide cellular communication according to embodiments of inventive concepts. As shown, RAN node 200 may include a transceiver circuit 202 (also referred to as a transceiver) including a transmitter and a receiver configured to provide uplink and downlink radio communications with wireless devices. The RAN node 200 may include a network interface circuit 204 (also referred to as a network interface) configured to provide communications with other nodes (e.g., with other base stations and/or core network nodes) of the wireless communication network. The RAN node 200 may also include a processor circuit 206 (also referred to as a processor) coupled to the transceiver circuit 202, and a memory circuit 208 (also referred to as memory) coupled to the processor circuit 206. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the RAN node 200 may be performed by processor 206, network interface 204, and/or transceiver 202. For example, processor 206 may control transceiver 202 to transmit downlink communications through transceiver 202 over a radio interface to one or more UEs and/or to receive uplink communications through transceiver 202 from one or more UEs over a radio interface. Similarly, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations (e.g., operations discussed below with respect to example embodiments). In addition, a structure similar to that of FIG. 2 may be used to implement other network nodes (e.g., AMF, SMF, UPF, AF, and/or NEF nodes, as discussed in further detail below), for example, omitting transceiver 202. Moreover, network nodes discussed herein may be implemented as virtual network nodes.

Figure 3:
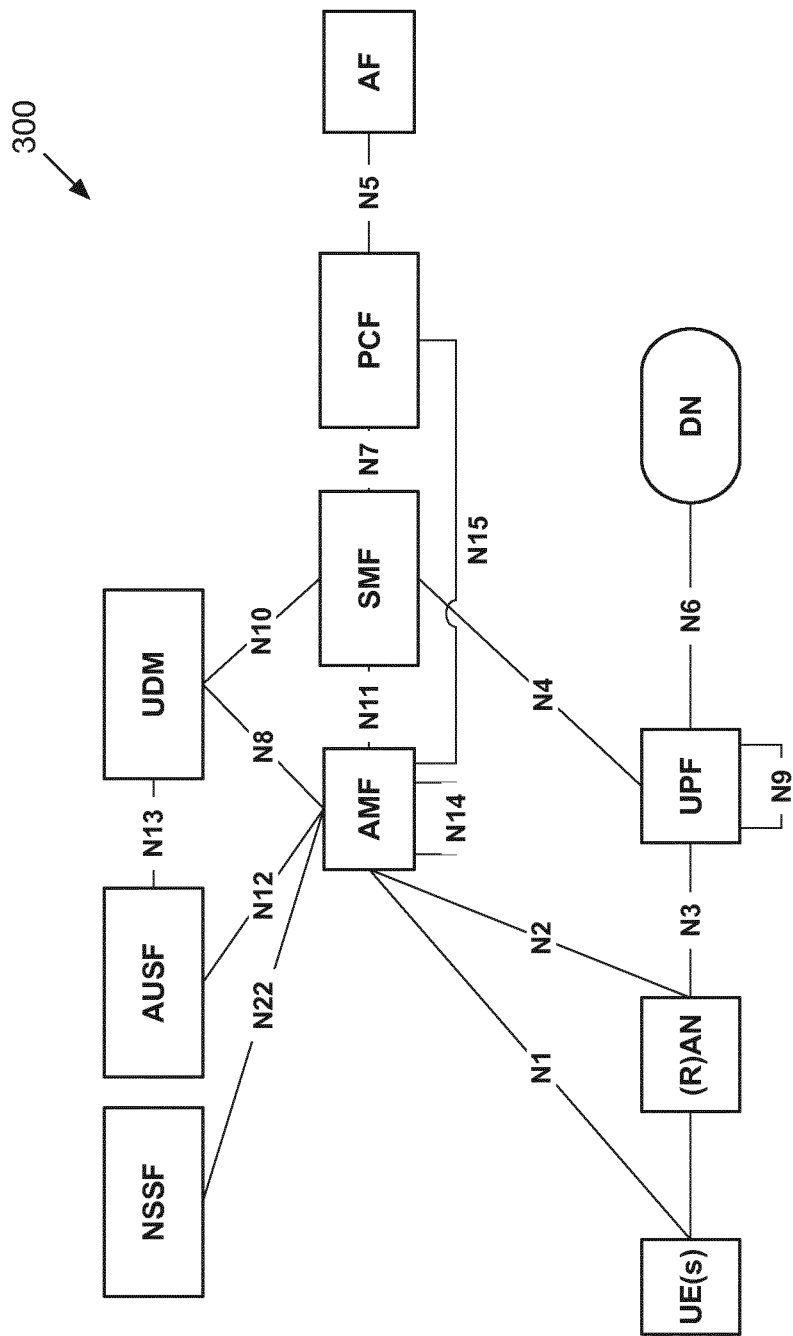
FIG. 3 is a block diagram illustrating a wireless communication system representing a 5G network architecture composed of core network functions (NFs)

FIG. 3 illustrates a wireless communication system 300 represented as a 5G network architecture composed of core network functions (NFs), where interaction between any two NFs is represented by a point-to-point reference point/interface.

Seen from the access side, the 5G network architecture shown in FIG. 3 includes a plurality of User Equipment (UEs) connected to either a Radio Access Network (RAN) or an Access Network (AN) as well as an Access and Mobility Management Function (AMF). Typically, the R(AN) comprises base stations, such as evolved Node Bs (eNBs) or 5G base stations (gNBs) or similar. Seen from the core network side, the 5G core NFs shown in FIG. 3 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

As illustrated in FIG. 3, reference point representations of the 5G network architecture are used to develop detailed call flows in the normative standardization. For example, the N1 reference point is defined to carry signaling between UE and AMF. In other examples, the reference points for connecting between AN and AMF and between AN and UPF are defined as N2 and N3, respectively. In FIG. 3, there is a reference point, N11, between AMF and SMF. In this regard, the SMF is at least partly controlled by AMF in some embodiments. N4 may be used by SMF and UPF so that the UPF can be set using a control signal generated by the SMF, and the UPF can report its state to the SMF. In some embodiments, N9 is the reference point for the connection between different UPFs, and N14 is the reference point connecting between different AMFs, respectively. As shown, N15 and N7 are defined since PCF applies policy to AMF and SMP, respectively. N12 may be required for the AMF to perform authentication of the UE. N8 and N10 are defined because the subscription data of UE may be required for AMF and SMF.

One of the aims of the 5G core network is to separate the user plane and control plane. The user plane typically carries user traffic while the control plane typically carries signaling in the network. In FIG. 3, the UPF is in the user plane and all other NFs (i.e., AMF, SMF, PCF, AF, AUSF, and UDM) are in the control plane. Separating the user and control planes guarantees each plane resource to be scaled independently. Such separation may also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture, as discussed herein, may be composed of modularized functions. For example, the AMF and SMF illustrated in FIG. 3 are independent functions in the control plane. Separated AMF and SMF allow independent evolution and scaling. Other control plane functions like PCF and AUSF can be separated as shown in FIG. 3. Modularized function design enables the 5G core network to support various services flexibly.

Each NF may interact with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
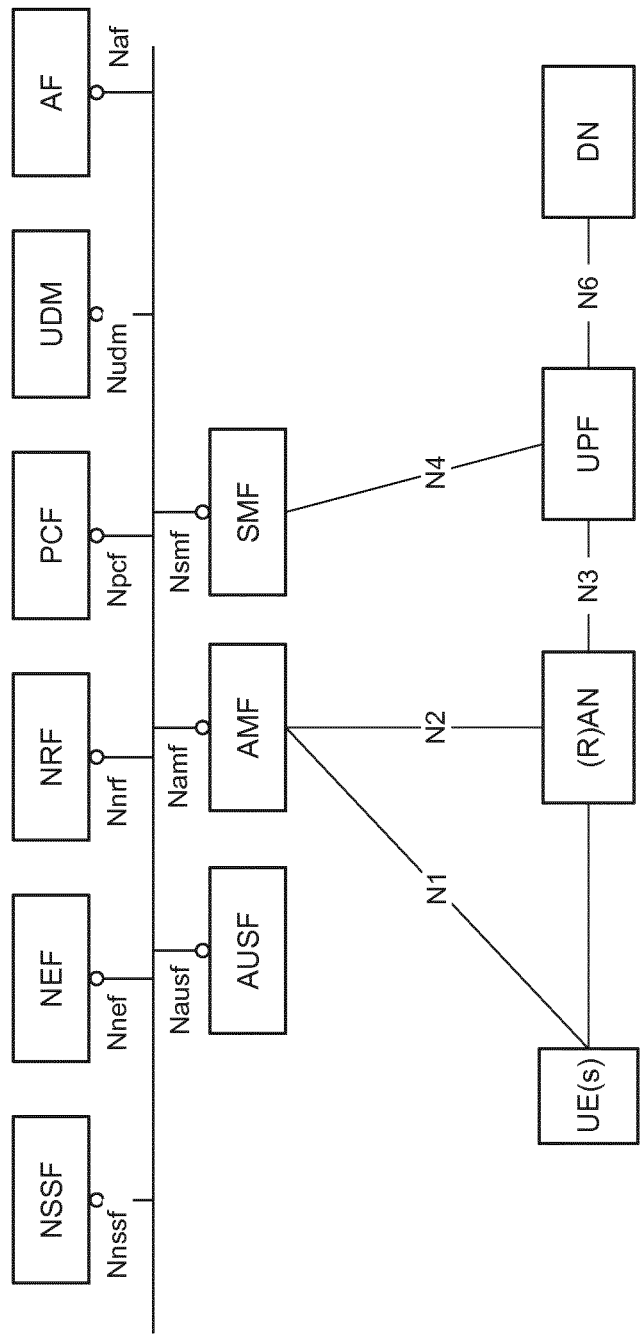
FIG. 4 is a block diagram illustrating a 5G network architecture using service-based interfaces between the NFs in the control plane instead of the point-to-point reference points/interfaces used in the 5G network architecture of FIG. 1.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) that a NF provides to other authorized NFs can be exposed to the authorized NFs through the service-based interface. In FIG. 4 the service based interfaces are indicated by the letter "N" followed by the name of the NF (e.g., Namf for the service based interface of the AMF and Nsmf for the service based interface of the SMF). The Network Exposure Function (NEF) and the Network Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies can be connected to a single AMF because the AMF is independent of the access technologies. The SMF is responsible for session management and allocates IP addresses to UEs. The SMF also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar. In some embodiments, an NF may be implemented either as a network element on a dedicated hardware, as a software instance running on a dedicated hardware, or as a virtualized function instantiated on an appropriate platform (e.g., a cloud infrastructure).

As discussed above, the 5th Generation 5G Cellular Internet of Things (CIoT) study in 3GPP SA2 provides a few User Plane (UP) changes, improvements, and/or optimizations for 5G CIoT. A few of these may use a wireless device user equipment (UE) context in the next-generation (NG) radio access network (RAN) (NG-RAN). For example, solution 19 (5G UP Optimization) and solution 7 (Small data frequent communication) in TR 23.724 V1.0.0 discuss using a UE context in the NG-RAN.

In this regard, solution 7 addresses Frequent Small data communication. This solution allows a UE used for frequent small data communication to use an extended idle mode discontinuous reception (eDRX) power saving method as investigated in Key Issue (KI) #4. This can allow for UE power efficiency for traffic patterns for frequent small data communication with gaps between transmissions Solution 7 uses combinations of RRC Inactive, EDT, power saving methods, and HLCOM (see key issue 3 High latency communication) to meet the architecture requirement on both resource-efficiency and UE power efficiency. The solutions, as described, have two options for data buffering at MT data transmissions:

(a) DL data buffering in RAN (solution in clause 6.7.4.2.2)
(b) DL data buffering in CN (solution 6.7.4.2.1)
(c) DL data buffering in CN (moving the UE to IDLE)

Option (a), with DL data buffering in RAN, may be used in some embodiments when a UE is not using eDRX (or eDRX with quite short sleep cycle e.g. a minute). In these cases, the RAN buffering can be very efficient. Option (b), with DL data buffering in CN, may be used in some embodiments when a UE is using eDRX (with longer sleep cycles (e.g., a minute or more)). In such cases, the CN may have relatively efficient buffer handling possibilities considering full UE mobility. In other embodiments, option (c) with DL data buffering in CN with the UE moved to CM-IDLE can be used for UE using longer sleep cycles. CN buffering may also be used when SCS/AS has requested UE reachability Monitoring Events. CN may also be able to send UE reachability event reports for SCS/AS that have requested notification when the UE wakes up from its power saving state. In some embodiments, the RAN may not handle such reporting.

Under solution 7, the following functions may be supported:
Small data being transmitted with reduced signalling using the RRC Inactive state. For single and dual packet transmissions (UL+DL), even further reduction of signalling over the radio may be achieved using the Early Data Transmission (subject to RAN decision).
Fast release of the RRC connection at single and dual packet transmissions may be supported, thereby maximizing the UE power efficiency.
Support for delivery of IP data and Unstructured (NIDD) data.
Support for MT data transmission to power saving devices (KI #4 functions e.g. eDRX) using extended buffering and UE reachability event notifications (KI 3 functions).
The existing UP security mechanisms in 5G system may be supported.
Support for charging, roaming, and policy control may be supported. Further 5G CIoT support for charging of messages may also be supported.

For DL data buffering under solution 7, interworking between 5GC and EPC may be achieved by a combined PGW/SMF and PGW-U+UPF. If a SMF/UPF has data buffered for a UE when the UE moves to EPC and becomes reachable then buffered data may be delivered in EPC (and vice versa). When interworking with EPC with N26, the source side may also be based on CIoT capability at target side decide if the PDU session or PDN connection is transferred during mobility.

When supporting EPC to 5GC, for a UE using CP CIoT EPS Optimization based PDN connection, CM-IDLE mode mobility may be used. In this regard, 5GC may decide during mobility or next MO/MT data if the RRC Inactive optimization is used. Mobility from EPC to 5GC can also be made in CM-CONNECTED mode for a UE using UP CIoT EPS Optimization based PDN connection, by a handover in CM-CONNECTED mode. When supporting 5GC to EPC, mobility from 5GC to EPC, can either be made as CM-IDLE mode mobility, or as 5GC to EPS CM-CONNECTED mode handover procedure if UP is supported on the EPC side (if not supported, CM-IDLE mode mobility may be used to EPC). On the EPS side it may be decided if either the UP CIoT EPS Optimization or the CP CIoT EPS Optimization shall be applied.

With regard to procedures under solution 7, MO transmissions for frequent small data communication may use RRC Inactive and Early Data Transmission to reduce the signalling. RRC Inactive with MO transmission can save a UE context in the RAN at an initial small data transmission. All subsequent MO small data transmissions can then gain the benefit of MO UL and DL transmission of small data without any 5G CP signalling. In such transmission, the RAN may forward UL data on the existing N3 interface. Any subsequent DL data and additional UL data can be forwarded in the same way. Unlike CP-data in the EPS, there may be no limit or break-even for how much subsequent DL and UL data can be forwarded during a single RRC connection with this solution before there is a signalling penalty (i.e., before the optimization and/or enhancement becomes less than optimal compared to sending the small data without any optimization and/or enhancement at all). Early Data Transmission with RRC Inactive and MO transmission may further increase signalling optimization over the radio by piggy backing the first UL data on the first DL data to the RRC establishment signalling. In some embodiments, this may save an additional one, or potentially two, messages over the radio.

Thus, in embodiments disclosed herein, to enable immediate suspension of the RRC connection, the RAN may use a UE provided Access Stratum (AS) Release Assistance Indication (RAI) or the Release Assistance (i.e. Traffic Profile) information in the Expected UE Behaviour stored in the UE context in RAN. In additional embodiments, to support immediate suspension, a UE Reachability Request Parameter for RAN (URRP-RAN) may be set in conjunction with MT data and MT signalling procedures (e.g. MT SMS).

When the URRP-RAN is set, the RAN may determine to not apply immediate release of the RRC Connection. This can provide time for pending or subsequent MT data and/or MT signalling to be conveyed when such procedures are imminent.

Disclosures herein further describe optimized and/or enhanced data transmission for small data by using an RRC Inactive state for the UE connected to a 5GS. RRC Inactive in some embodiments may be supported in 5GS from Rel-15 where a NG-RAN is used. In this regard, some embodiments disclosed herein use RRC Inactive also when NB-IoT and LTE-M are used. Thus, in some embodiments, the RRC_INACTIVE feature can transmit small data without necessarily performing a full state transition to RRC_CONNECTED (see TR 38.804 [15], Annex G). In this regard, the UPF-(NEF) entity in FIG. 5 may be the UPF-NEF (i.e. Small data delivery function) in an Indirect Model case (i.e. when NIDD API is used) and a UPF in a Direct Model case.

Figure 5:
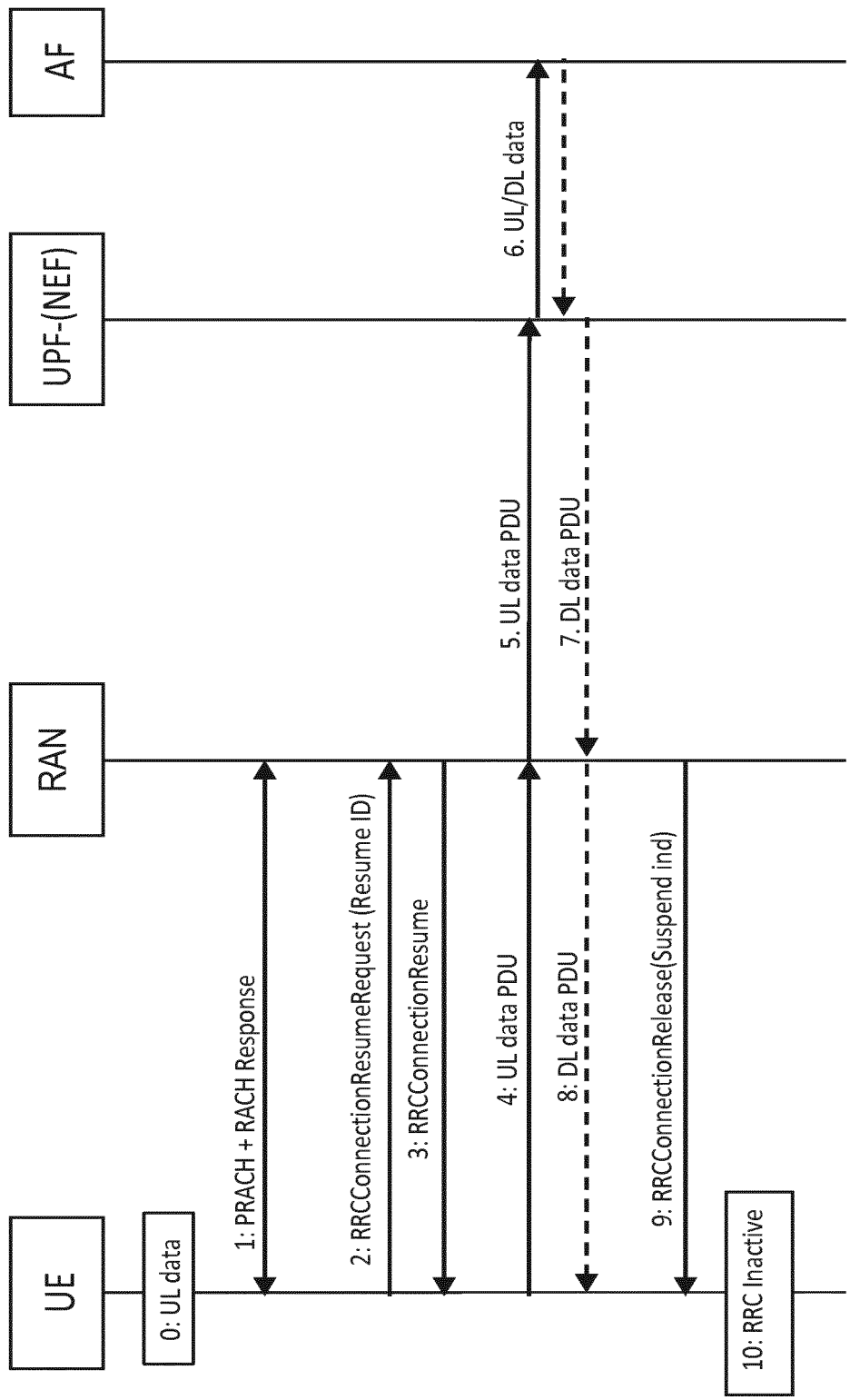
FIG. 5-12 is a message diagram illustrating operations in a wireless communication network according to some embodiments of inventive concepts.

As illustrated in operations 1-3 of FIG. 5, The RRC connection may be moved from inactive to active. In operations 4-5 of some embodiments, the UE sends a UL data PDU with small data to the RAN. In this manner, the RAN may forward the UL data PDU to the UPF. In some embodiments, if the UE provided an AS RAI in operation 4 indicating a single packet and the URRP-RAN is not set, or if the Expected UE Behavior stored in the UE context in RAN contains a Release Assistance (Traffic Profile) Information which indicates single packet (and the AS RAI is not present) and the URRP-RAN is not set, then RAN may continue to operation 9 and immediately suspends the RRC connection. In other embodiments, where there is pending DL data in the RAN, the pending DL data may be sent to the UE and the RRC connection may be kept for potential subsequent UL (as a response to the pending DL data).

In some embodiments, operation 6 illustrated in FIG. 5 includes, for the Direct Model case, the UPF forwarding data to/from the AF (i.e. SCS/AS). In some embodiments, in the Indirect Model case, this operation includes the NIDD API. In some embodiments, operations 7-8 include the receiver responding with a DL data PDU (e.g., an acknowledgement) which is forwarded to the UE by the RAN. If the UE provided an AS RAI in operation 4 which indicated dual packets and the URRP-RAN is not set, or if the Expected UE Behavior stored in the UE context in RAN contains a Release Assistance (Traffic Profile) Information which indicates dual packets (and the AS RAI was not present) and the URRP-RAN is not set, then RAN may continue to operation 9 and immediately suspend the RRC connection unless there were both pending DL data in RAN and DL data received in operation 7 by which all DL data may be sent to the UE and the RRC connection may be kept for potential subsequent UL (as a response to the pending DL data). In some embodiments, operation 9 includes the RAN suspending the RRC connection to inactive mode after a RAN specific timeout. In this manner, some embodiments of operation 10 include the UE entering RRC Inactive mode.

Figure 6:
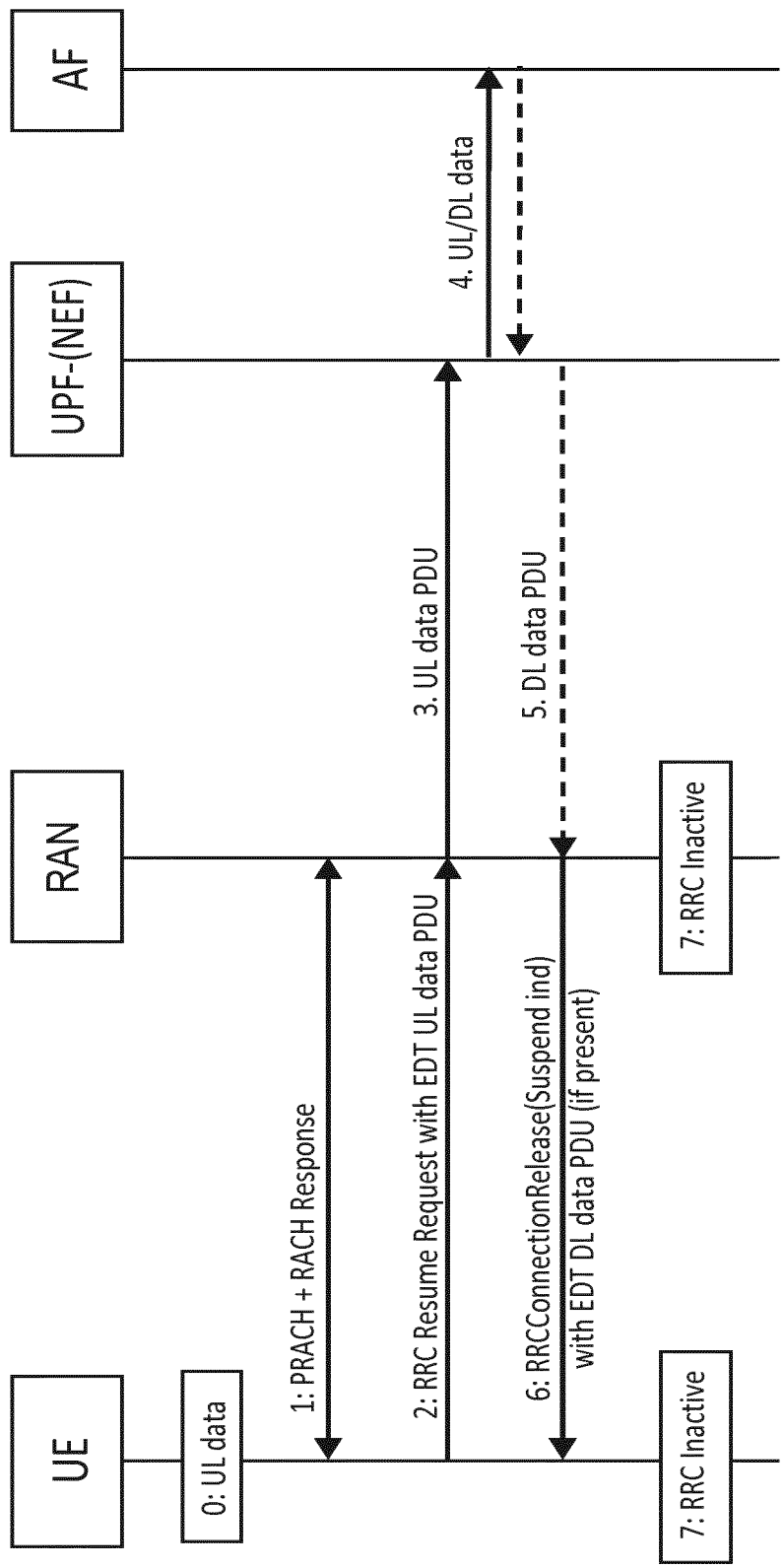

In additional embodiments, MO transmission with Early Data Transmission and RRC Inactive may be described. In this regard, FIG. 6 illustrates how efficient data transmission can be achieved for when there is one UL message (acknowledged or unacknowledged). Acknowledgements, if used, may often be generated by a protocol layer such as small data transmission function. The small data transmission function may be assumed, in some embodiments, to be dimensioned for low-latency response of small data communications, allowing the potential acknowledgement to be included as Early Data Transmission in the RRC Command message. In this manner, low delay communication may be enabled and reduced UE power consumption with a minimum signaling may also be enabled.

Thus, in some embodiments, the message diagram illustrated in FIG. 6 includes a UPF-(NEF) entity (i.e. small data delivery function) in the Indirect Model case (i.e. when NIDD API is used) and a UPF in the Direct Model case. In this regard, in some embodiments, an initial operation (operation 0) includes a UE determining to send a small data sensor value to the SCS/AS. After the initial operation 0, in some embodiments, operation 1 includes the UE being in RRC Inactive, and, before the UL data PDU can be transmitted, a resume of the radio connection may invoked. In operation 2, as illustrated, the UL data PDU may be included as Early Data Transmission with the RRC Resume Request. In operation 3, the RAN may find the UE context using the Resume ID and forward the UL data PDU on the N3 interface to the UPF. In some embodiments, if the UE provides an AS RAI in operation 2 which indicates a single packet and the URRP-RAN is not set, or if the Expected UE Behavior stored in the UE context in RAN contains a Release Assistance (Traffic Profile) Information which indicates single packet (and the AS RAI was not present) and the URRP-RAN is not set, then the RAN may immediately suspend the RRC connection unless there is pending DL data in the RAN by which the RAN instead sends an RRC Connection Resume to the UE (to keep the RRC connection for potential subsequent UL and DL data) with a pending DL data packet included as Early Data Transmission. Normal inactivity, in some embodiments, may trigger the suspension of the RRC Connection.

As further illustrated in FIG. 6, operation 4 includes, for the Direct Model case, the UPF forwarding data to/from the AF (i.e. SCS/AS). For the Indirect Model case, operation 4 may include the NIDD API. One such example is discussed with regard to the UPF-NEF solution. In some embodiments, operation 5 includes the receiver responding with a DL data PDU (e.g. an acknowledgement). In some embodiments, operation 6 includes the RAN receiving the DL data PDU before the RRC respond timer expires in the RAN and the UE provides AS RAI indicating dual packets and that the URRP-RAN is not set, or if the Expected UE Behavior stored in the UE context in the RAN indicates dual packets and that the AS RAI is not present and that the URRP-RAN is not set, then the RAN expects no further data and includes the DL data PDU as Early Data Transmission with the RRC Connection Release with a suspend indication sent to the UE. In some embodiments, if the RRC respond timer expires without any received DL data and the RAN expects further data (i.e., the UE provides AS RAI indicated dual packets, or if the Expected UE Behavior stored in the UE context in the RAN indicates dual or multiple packets and the AS RAI is not present, or if the URRP-RAN is set), then RAN sends an RRC Connection Resume to the UE to allow DL data that may have been delayed to be otherwise transmitted. In other embodiments, normal inactivity may trigger the suspension of the RRC Connection. If, in some embodiments, AS RAI is not present and the Expected UE Behavior stored in the UE context in RAN indicates multiple packets or does not include any Release Assistance (Traffic Profile) Information, or if the URRP-RAN is set, then RAN may determine that further packets or signaling can be expected and instead moves the UE to RRC_CONNECTED state by sending an RRC Connection Resume to the UE. In some embodiments, normal inactivity may trigger the suspension of the RRC Connection. In other embodiments, operation 7 of FIG. 6 includes the UE and RAN entering RRC Inactive mode.

Figure 7:
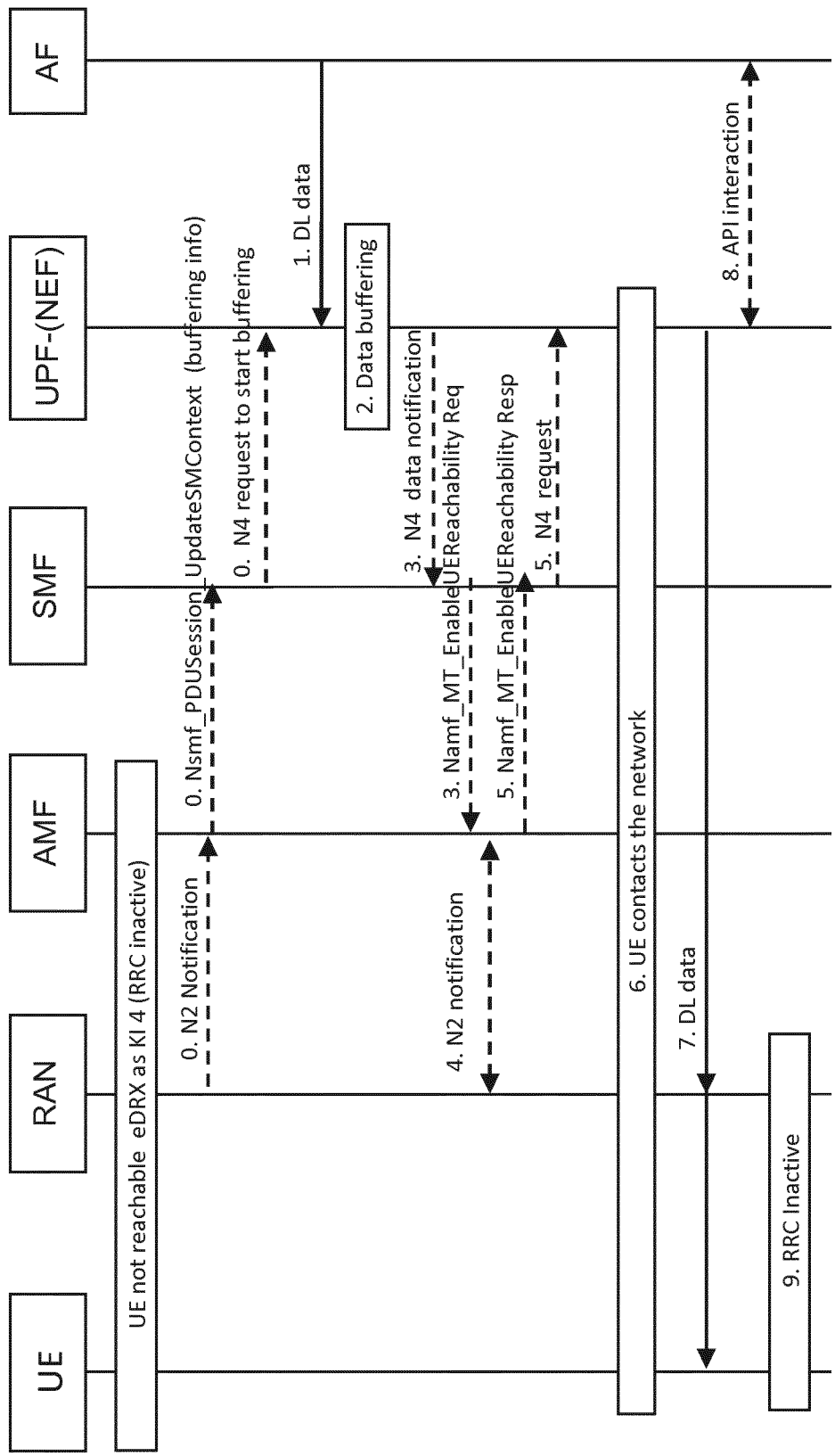

In some embodiments, MT transmissions may be less frequent in massive IoT scenarios. However, MT transmissions may still need to be handled in such scenarios. In this regard, FIG. 7 illustrates a procedure describing RRC Inactive with option (b), DL data buffering in CN. As illustrated in FIG. 7, the UPF-(NEF) entity may be the UPF-NEF (i.e. small data delivery function) in the Indirect Model case (i.e. when NIDD API is used) and/or it may be a UPF in the Direct Model case. In an initial operation (operation 0), Extended Data Buffering may be established when a RAN transitions a UE using eDRX to RRC Inactive state and the RAN sends an N2 Notification to an AMF. In this manner, in some embodiments, the RAN may provide buffering support information. The AMF may use the Nsmf_PDUSession_UpdateSMContext service to pass the buffering info (i.e., buffering duration) to the SMF in some embodiments. In this regard, the SMF may use N4 messages to remove UPF N3 DL tunnel, activate extended buffering of DL data, and set the Buffering duration.

In this manner, in some embodiments, operation 1 of the procedure illustrated in FIG. 7 includes having the DL data arrive (i.e., receiving the DL data). As illustrated, operation 2 may include buffering the DL data in the UPF based on aspects of operation 0. In additional embodiments, operation 3 of FIG. 7 includes the SMF requesting a UE reachability report via Namf_MT_EnableUEReachability, based on N4 data notification from UPF. In this regard, the SMF in some embodiments may wait for the next MO data from the UE (as discussed with respect to operation 6 below) to trigger the sending of downlink data without invoke enabling the UE reachability reporting. In yet other embodiments, operation 4 of the procedure illustrated in FIG. 7 includes the AMF using the N2 Notification procedure with the RAN-NGAP-ID included (to identify the UE context in RAN) to retrieve UE reachability info. In this manner, the NG-RAN may set the URRP-RAN for the UE and the AMF sets the URRP-AMF and may remember the requesting SMF. In some embodiments, the RAN may provide new buffering support information, if there is any.

FIG. 7 also illustrates operation 5, which includes the AMF notifying the SMF with the latest reachability info. In some embodiments, either the UE is reachable or still not reachable with potentially new buffering duration. The SMF may use N4 data request to update a buffering duration for the UPF DL Tunnel if desired. Operation 6, as illustrated in FIG. 7, includes the UE contacting the network and the AMF either receiving an N2 notification triggered by an RRC resume or an N2 Path Switch Request (if the RRC resume triggers a RAN node change). The AMF may notify the SMF/UPF of the UE reachability and clear the URRP-AMF. Operation 7 of the procedure illustrated in FIG. 7 includes the UPF delivering the buffered DL data to the UE. Operation 8 includes, for some embodiments related to the Indirect Model, the interaction with the AF according to the NIDD API. Operation 9 of the procedure illustrated in FIG. 7 includes the RAN moving the UE to an RRC Inactive state after a user inactivity timeout or based on Release Assistance Information if available in Expected UE Behavior. Depending on sleep cycle length and local configuration, the RAN may then execute operation 0 above and re-establish the CN extended data buffering in SMF/UPF. Otherwise, the RAN buffering may be used at a next DL data event. In some embodiments, if the UE does not contact the network before expiry of the extended buffering duration timer, the buffered data may be discarded in the SMF/UPF.

In some embodiments, procedures for MT data with the RAN buffering at RRC inactive are included. In at least one embodiment, a first operation of a procedure includes the UPF sending a DL data PDU towards the UE. In some embodiments, the RAN buffers the DL data during RAN paging (if desired) and/or during the UE sleep cycle (if power saving method is used). The AMF may use CN buffering if the UE uses eDRX with sleep cycles longer than a given time (e.g., one minute). A second operation of such procedures may include the RAN delivering the DL data PDU to the UE when the UE becomes reachable. In this regard, a third operation of a procedure for MT data may include the RAN moving the UE to an RRC Inactive state after a user inactivity timeout or based on Release Assistance (Traffic Profile) Information if available in Expected UE Behavior.

As noted above, aspects disclosed herein also address solution 19, which relates to 5GS UP optimization and/or enhancement for infrequent small data transmission. Solution 19 may increase the efficiency and/or optimize/enhance small data transmission for UEs from CM-IDLE mode. In some embodiments, solution 19 enables transfer of user plane data without need for a Service Request procedure. In some embodiments, solution 19 includes keeping AS context in the NG-RAN including information the UPF connection and relevant QoS flow(s) to be used for the connection, even when UE moves into CM-IDLE. When the UE resumes the connection, the NG-RAN uses the information to activate DRB, AS security, and User Plane connectivity over N3 for the small data packet delivery to the UPF. The UPF also may keep N3 tunnel information for the PDU session to allow UL data transmission.

Solution 19 has the following characteristics:
- The AS context contains information related to the N3 tunnel, N2AP association, UE context and DRB context, AS security information, Header Compression context, and any necessary for RRC resume. The AS context is configured during PDU session establishment or registration.
- UE and NG-RAN may perform header compression for IP data based on the Header Compression context.
- The AS context is kept in NG-RAN and UE after the connection suspend procedure.
- AS security context is established between the NG-RAN and the UE. Therefore, AS security mechanisms may be used.
- NG-RAN performs Connection Suspend procedure to suspend the connection for the UE. NG-RAN may indicate a release cause set to RRC-suspend, and may include the resume ID which is stored by the UE.
- UE performs Connection Resume procedure using resume ID from CM-IDLE/RRC-IDLE state. In this manner, solution 19 may also be applicable to MICO mode UE.
- After the UE performs RRC resume procedure, if the NG-RAN determines the AS context for the UE to be valid, then the NG-RAN may derive the AS security information, DRB, QoS flow and N3 tunnel information for the UE. The NG-RAN may activate AS security, related DRB(s) and N3 tunnel(s).
- As NG-RAN keeps N3 Uplink Tunnel Endpoint ID in the AS context, user plane for uplink transmission may also be maintained. Also UPF may keep N3 Uplink Tunnel Endpoint ID to allow UL data.
- In case the NG-RAN is changed, a new NG-RAN may send N3 Downlink TEID to SMF, and SMF may update this information to UPF so that path for downlink data transmission becomes available.
- In the case of selective activation of UP connections during service request procedure or CN-initiated selective deactivation of UP connection (see TS 23.502 [7]), when the UE enters CM-IDLE via Connection Suspend procedure the AS context only contains the PDU session(s) that are active. When there is MO Data, the procedure may include as follows:
  - The UE performing Connection Resume procedure(s) at the RRC layer. The UE and NG-RAN may resume the PDU sessions that were active during Connection suspend procedure.
  - The RRC layer may notify the NAS of the change of state to the RRC connected and the PDU session(s) that are active. The NAS may be made aware that all PDU session(s) that were active during Connection suspend procedure will be reactivated at the next RRC resume procedure. If the NAS requires to further activate PDU session(s) that is/are not active, the UE may initiate a service request from a CM connected (i.e., after Connection resume procedure is complete) to activate the necessary PDU session(s).

Given that IoT devices are not likely to have a large number of PDU sessions, to reduce power consumption and signaling, it may be beneficial to not use selective activation/deactivation of UP connection(s) and to activate all PDU sessions when the UE is in CM-CONNECTED.

In some embodiments, the AS context is stored in the NG-RAN. In such embodiments, the AS context may include UPF or PDU session related information for the UE, which has been provided during PDU session establishment. During PDU Session establishment procedure, the SMF may provide N2 SM information which is stored in the NG-RAN in the AS context. The UE and the NG-RAN may use Resume ID to identify AS context. In some embodiments, when the NG-RAN suspends the RRC connection to the UE, the NG-RAN notifies the AMF with the AS context to be kept in the AMF as transparent. If a new serving NG-RAN fails to retrieve the AS context from the old NG-RAN, the new NG-RAN asks to the AMF to retrieve the AS context stored in the AMF.

When the UE in CM-IDLE sends UL data or the UE receives paging message, the UE requests to resume RRC Connection if there is a suspended AS context stored in the UE. During a resume procedure, the NG-RAN derives necessary information to activate AS security, DRB, and the path over N3 to the UPF. After the RRC connection is established, the UE may send UL data, and then the RAN may forward the data on the N3 interface. In some embodiments, the NG-RAN does not have to signal to the AMF before sending UL data. The NG-RAN conditionally notifies the AMF of the UE's connection resume without depending on timing of UL data forwarding. For example, this may occur if a DL tunnel is expected to be needed based on the AS RAI.

In some embodiments, connected mode mobility is supported by existing handover procedures. When the UE requests an RRC resume and if the NG-RAN doesn't have valid AS context to resume the UE's connection, the NG-RAN may perform context fetch to retrieve the valid AS context that is kept in the last serving NG-RAN. In some embodiments, if there is Xn connectivity, the new NG-RAN may perform an NGAP procedure for context fetch with the last serving NG-RAN. If there is no Xn connectivity, the new NG-RAN may request the context from the last serving NG-RAN. If the NG-RAN node fails to fetch the valid AS context, the NG-RAN may reject the resume and the UE may follow procedures defined in stage-3. In embodiments where the UE enters a new TA currently not part of the UE registration area, the UE may request RRC resume and may initiate a NAS registration update. In some embodiments, the SMF may subscribe UE location change to the AMF in order to determine UPF re-allocation and update N3 tunnel information. The SMF may subscribe change of serving NG-RAN node to the AMF in order to determine update of N3 tunnel information.

Figure 8:
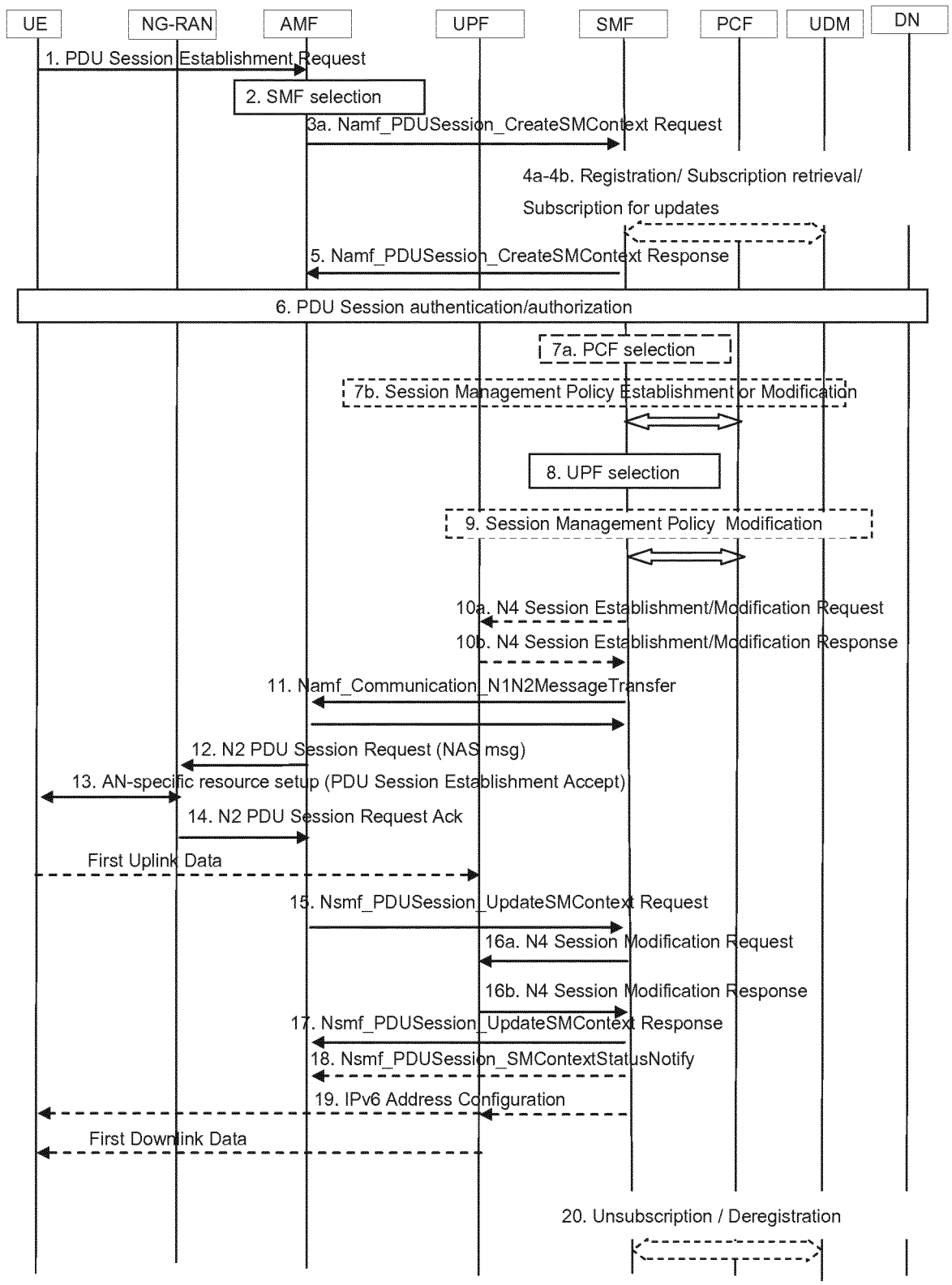

In this regard, FIG. 8 illustrates a message diagram with a UE-requested PDU session establishment for 5GS UP optimization and/or enhancement. With regard to FIG. 8, it is assumed that the UE has already registered in the 5G system. When the UE requests a PDU session establishment, the UE may indicate to use 5GS UP optimization and/or enhancement to the AMF, and the AMF may indicate the request of 5GS UP optimization and/or enhancement to the SMF. During the PDU Session establishment procedure, the SMF may inform the NG-RAN of the established PDU session. The SMF may know usage of 5GS UP optimization and/or enhancement for the PDU session for keeping N3 UL TEID, and the NG-RAN may know usage of 5GS UP optimization and/or enhancement for determining to apply RRC suspend/resume and store the information for the PDU Session in the AS context.

Thus, procedures described in FIG. 8 may include:
Operation 1: The UE may provide an indication that it wants to use 5GS UP Optimization and/or enhancement (e.g., use of Resume/Suspend procedure) to the AMF. In some embodiments, it is assumed that NG-RAN broadcasts system information with indicating the support of resume/suspend.

Operation 2: The AMF may select an SMF that supports the use of 5GS UP Optimization Operation 3a: The AMF may indicate the support of 5GS UP Optimization in the Nsmf_PDUSession_CreateSMContext Request operation. In some embodiments, the SMF may considers this PDU session establishment message for 5GS UP Optimization and/or enhancement, and can determine the UP connection for this PDU session should not be de-activated. The AMF may provide the registration area of the UE to the SMF in order to assist the SMF in selecting the UPF which can be maintained while UE mobility happens within the registration area. In some embodiments, the UPF may not be changed in the registration area. In this manner, if the UE moves out of the registration area, UPF can be re-allocated during mobility registration procedure, by invoking Nsmf_PDUSession_UpdateSMContext.

While not discussed in detail herein, operations 4-7 may also relate to the UE-requested PDU session establishment for 5GS UP optimization and/or enhancement. Operation 8 of FIG. 8 includes the SMF selecting a UPF that supports the 5GS UP optimization. Once selected, in some embodiments, a later operation, such as operation 11, may include the SMF including the indication of 5GS UP Optimization in N2 SM message to the NG-RAN so that NG-RAN can determine to perform RRC suspend procedure to the UE, and to store information for the PDU session in the AS context.

Figure 9:
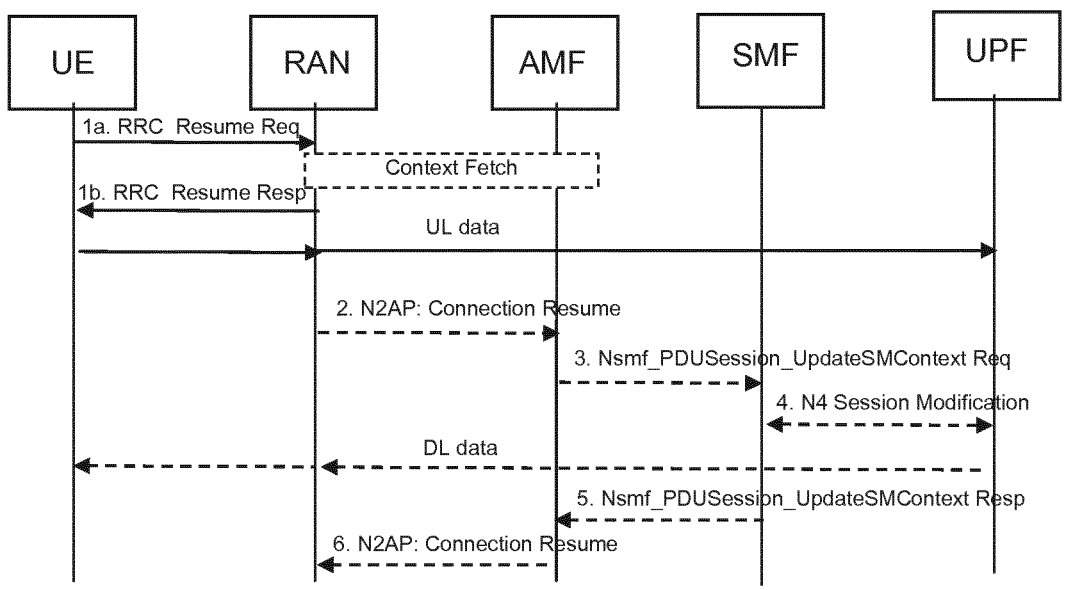

FIG. 9 illustrates an example of how MO small data packet may be delivered from the UE. In this regard, the following operations may be performed, as illustrated in FIG. 9:

Operation 1a/1b: The UE may trigger RRC Connection Resume procedure including Resume ID which may identify the AS context stored in the NG-RAN. Using the valid AS Context for the UE, the NG-RAN may perform an AS security check, that DRB is established, and that the NG-RAN enables N3 UL TEID for data delivery. If the Resume ID indicates another NG-RAN within Xn connectivity (i.e., an old NG-RAN), then the NG-RAN may perform direct context fetch via Xn. If the NG-RAN fails to get a valid AS context, the NG-RAN may reject the RRC Connection Resume with an appropriate cause, so that the UE can perform the related NAS procedure. In some embodiments, the UE can send UL data right after successful RRC Connection Resume procedure. The NG-RAN may also forward the UL data received from the UE to the UPF by using N3 UL TEID in the AS context.

Operation 2: If NG-RAN expects no DL data (e.g., based on AS RAI indicating single packet) and the URRP-RAN is not set, or based on the Expected UE Behavior (with Release Assistance Information(Traffic Profile) available in the UE context in NG-RAN) indicating single packet (and the AS RAI is not present) and the URRP-RAN is not set, the NG-RAN may immediately suspend the RRC connection. If the NG-RAN expect DL data or DL signalling (URRP-RAN is set), the NG-RAN may clear the URRP-RAN and notify the AMF that UE connection has been resumed by sending N2AP message which includes N2 SM info and PDU Session ID. The NG-RAN includes N3 DL TEID for the PDU session in the N2 SM message.

Operation 3: In some embodiments, the AMF enters CM-Connected state, identifies the UE context, and forwards the N2 SM message to the SMF.

Operation 4: The SMF identifies the UE and the PDU session. If there is an N2 SM message in the Nsmf_PDUSession_UpdateSMcontext request message, the SMF may perform N4 Session Modification to update N3 DL TEID to the UPF. If there is DL data arrived for the UE, the UPF may forward the data to the NG-RAN using N3 DL TEID.

Operation 5: The SMF can send the Nsmf_PDUSession_UpdateSMcontext response. If there is any change for the PDU session (e.g., in case of the QoS targets cannot be fulfilled for a QFI), the SMF may inform this information in the N2 SM information.

Operation 6: The AMF may acknowledge the connection resume to the NG-RAN. If there is change of PDU session as received in N2 SM message from the SMF, the NG-RAN can perform RRC reconfiguration. The AMF may also provide the indication of single or dual packet information to NG-RAN (e.g. by including the Expected UE Behavior) in case the NG-RAN does not already have this information).

Figure 10:
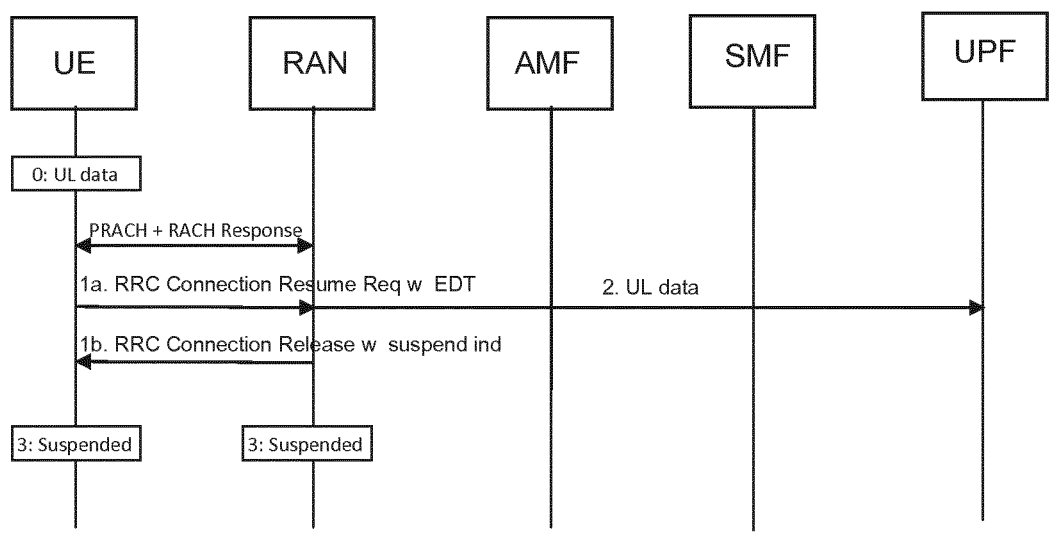

FIG. 10 illustrates an example of how a single MO small data is delivered from the UE using Early Data Transmission. In some embodiments, for Early Data Transmission with dual or multiple packet transmission, or unknown number of packets, or the procedure continues after operation 1a, as shown above, except that first UL data packet does not require a specific UL message from UE to RAN. In this regard, the following operations may be performed according to some embodiments, as illustrated in FIG. 10:

Operation 1a: The UE may send RRC Connection Resume Request with the UL data included as Early Data Transmission with the RRC Connection Resume Request. Using the valid AS Context for the UE, the NG-RAN may thereby enable N3 UL TEID for data delivery.

Operation 1b: Either based on the AS Release Assistance Indication (RAI) included by the UE in operation 1a indicating single packet transmission and the URRP-RAN is not set, or if the Expected UE Behavior is available and stored in the UE context in RAN (with a Release Assistance Information present) indicating single packet (and the AS RAI is not present in operation 1a) and the URRP-RAN is not set, the NG RAN may immediately suspend the RRC connection (to minimize UE power consumption). If the URRP-RAN is set, this procedure may continue after operation 1a.

Operation 2: The NG-RAN may forward the UL data received from the UE to the UPF by using N3 UL TEID in the AS context.

Operation 3: The UE and RAN may remain suspended.

Figure 11:
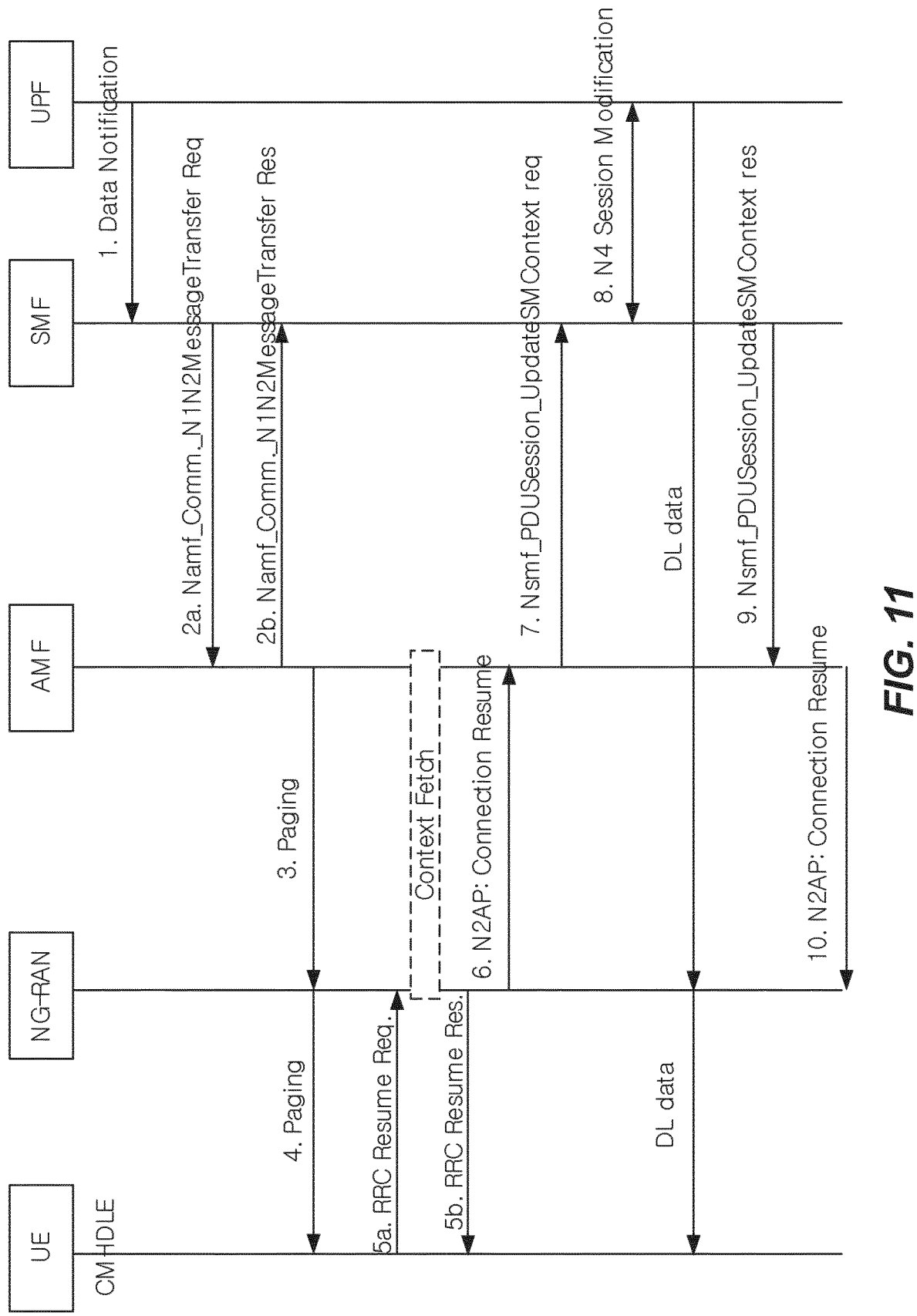

FIG. 11 illustrates an example of how MT small data packet(s) may be delivered to the UE in CM-IDLE. In this regard, the following operations may be performed according to some embodiments, as illustrated in FIG. 11:

Operation 1: At arrival of DL data, the UPF notifies the SMF.

Operation 2a: The SMF determines the AMF serving the UE, and invokes Namf_Comm_N1N2MessageTransfer to the AMF including PDU Session ID.

Operation 2b: The AMF responds to the SMF.

Operation 3: The AMF sends a paging message to the NG-RAN

Operation 4: The NG-RAN performs paging to the UE

Operations 5: The UE triggers RRC Connection Resume procedure including Resume ID which identifies the stored AS context in the NG-RAN. Using the valid AS Context for the UE, the NG-RAN performs security check, DRB is established, and NG-RAN enables N3 DL TEID for data delivery. If the Resume ID indicates another NG-RAN within Xn connectivity (i.e., old NG-RAN, the NG-RAN performs direct context fetch via Xn). In some embodiments, if the NG-RAN fails to retrieve valid AS context, it rejects the RRC connection Resume with an appropriate cause, so that the UE performs Service Request.

Operation 6: The NG-RAN notifies the AMF that UE connection has been resumed by sending N2AP message which includes N2 SM message and PDU Session ID. The NG-RAN includes N3 DL TEID for the PDU session in the N2 SM message.

Operation 7: The AMF enters CM-Connected state after receiving the N2AP message. The AMF determines the SMF based on the PDU Session ID received from step 2a and 6, and the AMF sends N2 SM message to the SMF. AMF clears the URRP-AMF and also notifies any other previously requesting NF(s) according to the "UE Activity Notification procedure" in TS 23.502, clause 4.2.5.3.

Operation 8: The SMF identifies the UE and the PDU session. Based on the received N2 SM message, the SMF performs N4 Session Modification to update N3 DL TEID to the UPF. The UPF forwards the data to the NG-RAN using N3 DL TEID.

Operation 9: The SMF sends Nsmf_PDUSession_UpdateSMcontext response.

Operation 10: The AMF acknowledges the connection resume to the NG-RAN.

Figure 12:
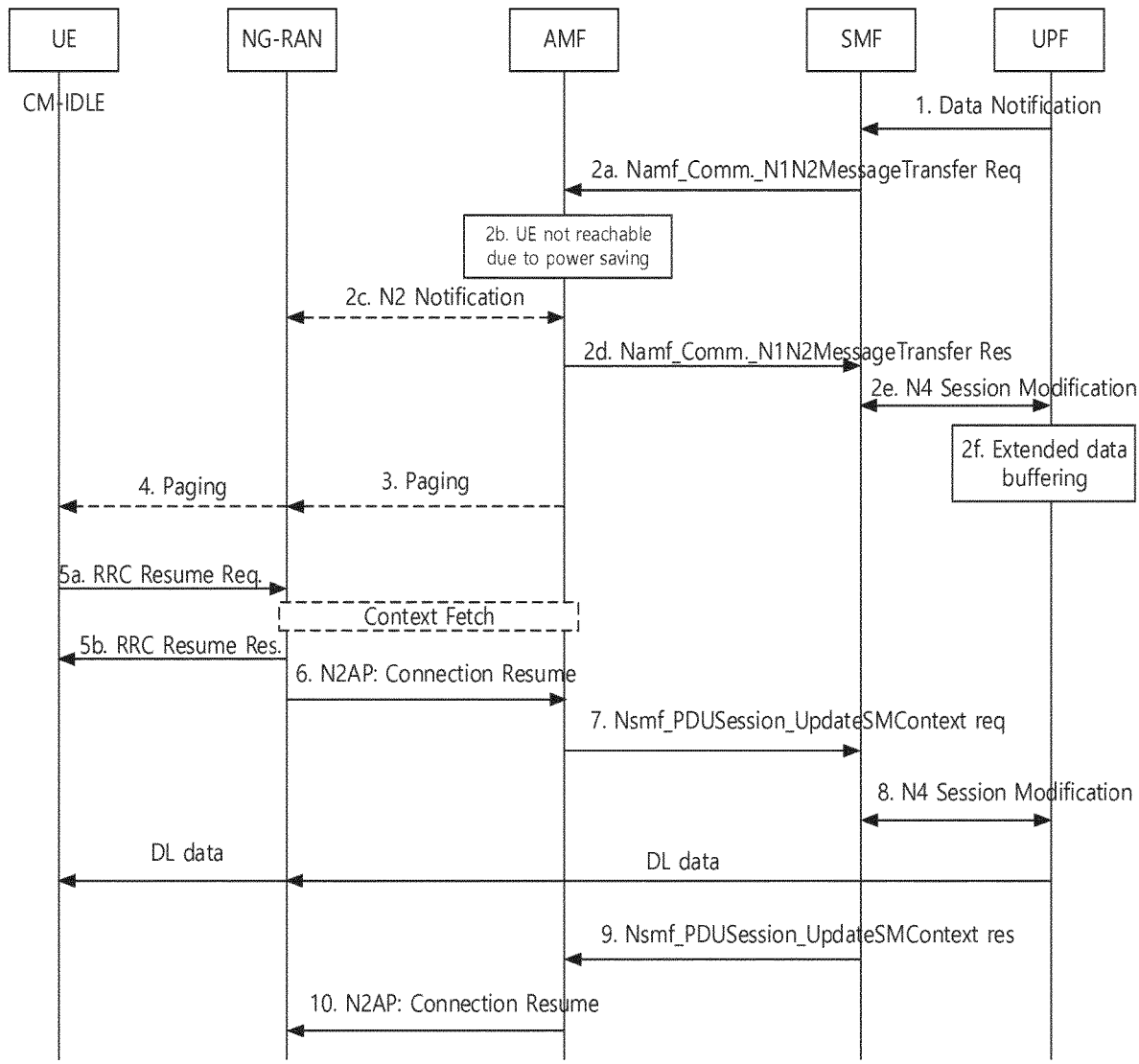

In some embodiments, MT small data packet is delivered to the UE using 5GS UP optimization and/or enhancement at power saving in CM-IDLE, in accordance with inventive concepts disclosed herein. In this regard, the following operations may be performed according to some embodiments as illustrated in FIG. 12:

Operation 1: At arrival of DL data, the UPF notifies the SMF.

Operation 2a: The SMF determines the AMF serving the UE, and invokes Namf_Comm_N1N2MessageTransfer to the AMF including PDU Session ID.

Operation 2b: The UE is not reachable due to power saving. If eDRX is used, the AMF schedules a paging for next PTW.

Operation 2c: The AMF sets the URRP-AMF (and remembers the requesting SMF) and sends an N2 Notification to the NG-RAN with the RAN-NGAP-ID included (to identify the UE context in RAN). The N2 Notification may be the existing N2 Notification procedure (see TS 23.502 clause 4.8.3) where a new parameter "URRP indicator" could be used, or a new procedure with a new message is used to notify RAN that the URRP-RAN shall be set for the UE. The NG-RAN sets the URRP-RAN for the UE.

Operation 2d: The AMF responds to the SMF that the UE is unreachable and indicates DL Buffering Requested and provides DL Buffering Duration time and optionally a DL Buffering Suggested Packet Count. The AMF stores the DL Data Buffer Expiration Time in the MM context.

Operation 2e: The SMF sends DDN failure to the UPF with DL Buffering Requested indication and the DL Buffering Duration time and optionally a DL Buffering Suggested Packet Count.

Operation 2f: The UPF calculates a DL Data Buffer Expiration Time based on the received DL Buffering Duration time and starts extended data buffering. Any subsequent DDN for additional DL data are suppressed until the DL Buffer Expiration Time has expired.

Operation 3: In some embodiments, if paging is scheduled in operation 2b, the AMF sends a paging message to the NG-RAN when the UE becomes reachable.

Operation 4: In yet other embodiments, the NG-RAN performs paging to the UE.

Operations 5-10: Similar to above, the NG-RAN notifies the AMF (and clears the URRP-RAN if set) that UE connection has been resumed by sending N2AP message which includes N2 SM message and PDU Session ID. The NG-RAN includes N3 DL TEID for the PDU session in the N2 SM message.

Operations of RAN node 200 will now be discussed with reference to the flow chart of FIG. 13 and the message diagrams illustrated and discussed above. In examples discussed herein, modules may be stored in base station memory 208 of FIG. 2, and these modules may provide instructions so that when the instructions of a module are executed by processor 206, processor 206 performs respective operations of the flow chart of FIG. 13.

Figure 13:
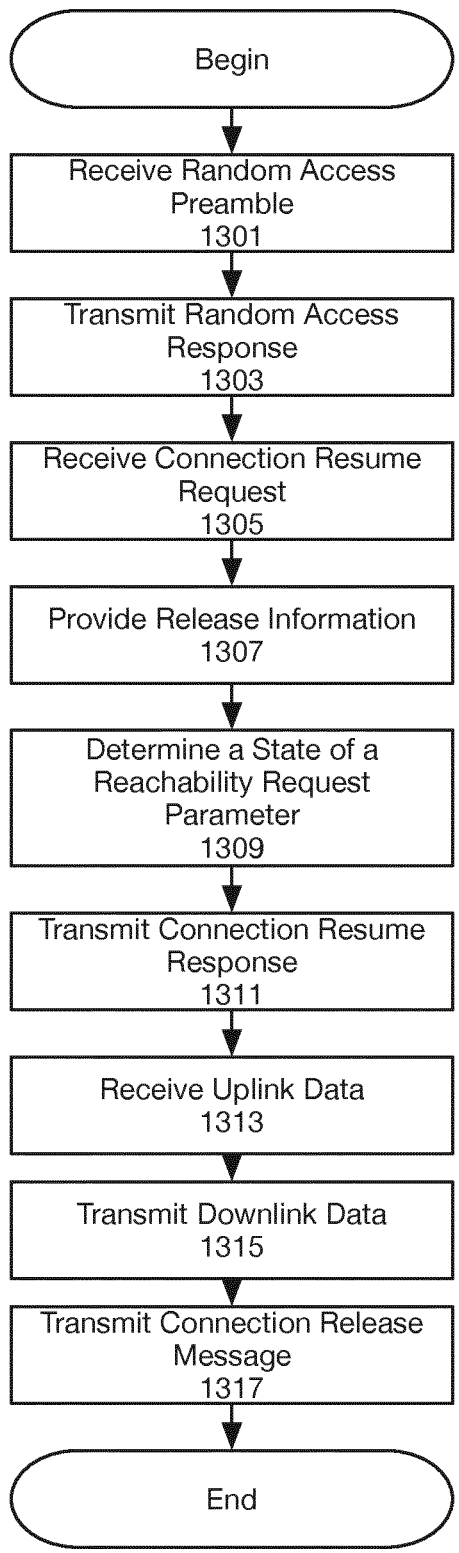
FIGS. 13-21 are flowcharts illustrating operations of a RAN node according to some embodiments of inventive concepts.

In this regard, FIG. 13 illustrates a flowchart of operations performed by a RAN, such as RAN node 200. At block 1301, processor 206 may receive a random access preamble message from wireless terminal 100 (through transceiver 202) for a random access procedure. At block 1303, processor 206 may transmit a random access response message through transceiver 202 to wireless terminal 100 for the random access procedure responsive to receiving the random access preamble message from the wireless terminal. At block 1305, processor 206 may receive a connection resume request message from a wireless terminal 100 at the RAN node 200 instructing the RAN node 200 to establish a connection with the wireless terminal 100. At block 1307, the processor 206 may provide release information for the wireless terminal 100 at the RAN node 200. At block 1309, the processor 206 may determine a state of a reachability request parameter at the RAN node 200. At block 1311, the processor 206 may transmit a connection resume response message to the wireless terminal 100 in response to receiving the connection resume request message and determining the state of the reachability request parameter at the RAN node 200. At block 1313, processor 206 may receive uplink data from the wireless terminal 100 at the RAN node 200, wherein the uplink data may be associated with the connection resume request message. At block 1315, processor 206 may transmit downlink data to the wireless terminal 100 after receiving the uplink data. At block 1317, processor 206 may transmit a connection release message to the wireless terminal 100 after receiving the uplink data in response to the release information for the wireless terminal 100 and determining the state of a reachability request parameter at the RAN node 200. In this manner, responsive to the state of the reachability request parameter at the RAN node 200 having a first state, the processor 206 may instruct the RAN node to not immediately transmit a connection release message to release and/or suspend the connection with the wireless terminal 100.

Figure 14:
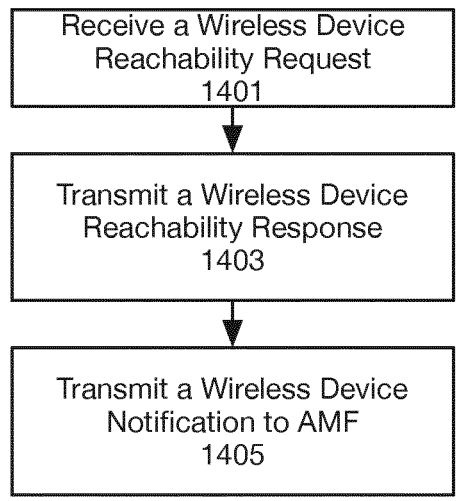

As illustrated in FIG. 14, additional embodiments include, as illustrated in block 1401, the processor 206 receiving a wireless device reachability request message that includes the reachability request parameter at the RAN node 200 and an identification of the wireless device 100 that corresponds to the request message. In some embodiments, as illustrated at block 1403, the processor transmits a wireless device reachability response to an access and mobility function (i.e., AMF). At block 1405, the processor 206, responsive to the wireless device becoming reachable, transmits a notification message to the AMF.

Figure 15:
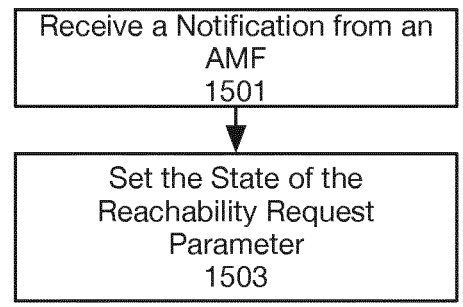

In other embodiments, as illustrated in FIG. 15 at block 1501 and 1503, the processor 206 may receive a notification from an AMF that includes information corresponding to wireless terminal context in the RAN node 200, and set the state of the reachability request parameter at the RAN node 200. In yet other embodiments, block 1501 may include receiving a notification from an AMF that includes the reachability request parameter at the RAN node 200.

Figure 16:
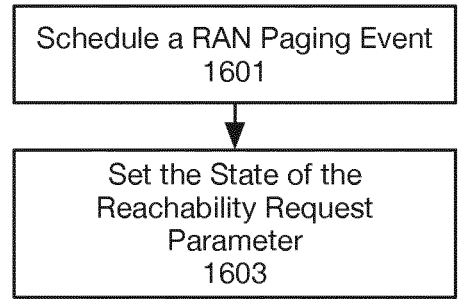

In further embodiments, as illustrated in FIG. 16 at blocks 1601 and 1603, the processor 206 may schedule a RAN paging event and set the state of the reachability request parameter at the RAN node 200 to indicate that a notification to an AMF will be performed at a next availability of the wireless device 100.

Figure 17:
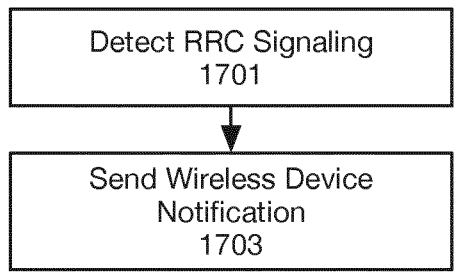

In further embodiments, as illustrated in the flowchart in FIG. 17 at blocks 1701 and 1703, the processor 206 may detect RRC signaling related to a wireless device that has a context in the RAN node 200 that includes the reachability request parameter for the wireless terminal 100. Further, the processor 206 may, responsive to detecting the RRC signaling that includes the reachability request parameter from the wireless terminal, send a wireless device notification that clears the state of the reachability request parameter.

Figure 18:

In further embodiments, as illustrated in the flowchart in FIG. 18 at block 1801, the processor 206 may receive a request from an AMF to report RRC state information.

Figure 19:
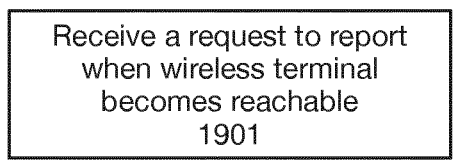

In further embodiments, as illustrated in FIG. 19 at block 1901, receive a request to report when the wireless terminal 100 becomes reachable by the RAN node 200.

Figure 20:
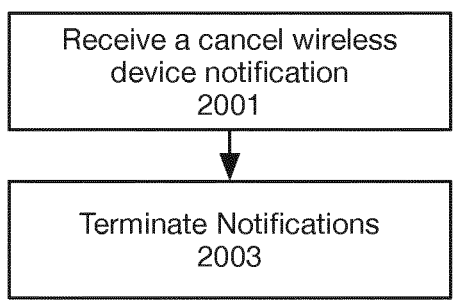

In further embodiments, as illustrated in FIG. 20 at blocks 2001 and 2003, the processor 206 may receive a cancel wireless device state notification message and, responsive to receiving the cancel wireless device state notification message, terminate notifications corresponding to the wireless device 100.

Figure 21:
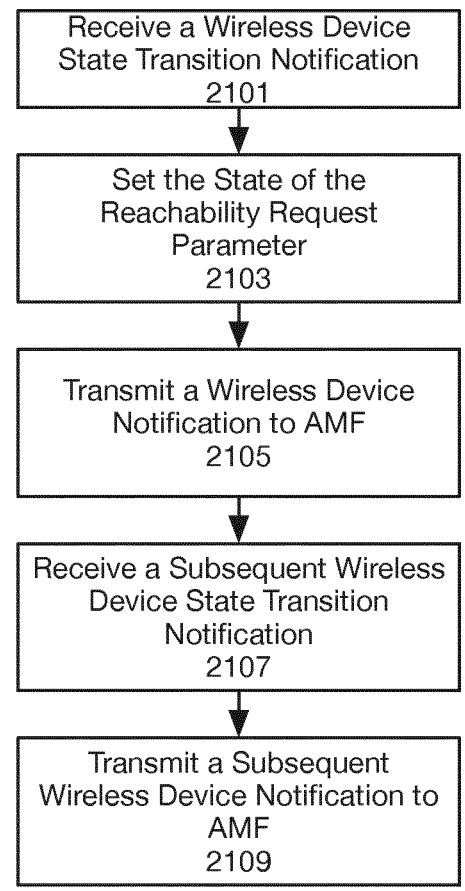

In additional embodiments, as illustrated in FIG. 21 at block 2101, the processor 206 may receive a wireless device state transition notification message request that identifies the wireless device and that comprises a reporting type. At block 2013, the processor 206 may set the state of the reachability request parameter for the wireless device 100. And, at block 2105, may transmit a wireless device notification message to an AMF. In this manner, the wireless device notification message may include information corresponding to a current RRC state of the wireless device 100. As illustrated at block 2107, the processor 206 may receive a subsequent wireless device state transition notification message request that identifies the wireless device 100 and that includes the reporting type. At block 2019, the processor 206 may transmit a subsequent wireless device notification message to an AMF, the wireless device notification message including information corresponding to the current RRC state of the wireless device 100.

Various operations from the flowcharts of FIGS. 13-21 may be optional with respect to some embodiments of base stations and related methods.

SOME EMBODIMENTS

Some of the embodiments described above may be summarized in the following manner:

1. A method of operating a radio access network, RAN, node (200) of a wireless communication network, the method comprising:
receiving (1305) a connection resume request message from a wireless terminal (100) at the RAN node instructing the RAN node to establish a connection with the wireless terminal;
providing (1307) release information for the wireless terminal at the RAN node;
determining (1309) a state of a reachability request parameter at the RAN node;
receiving (1313) uplink data from the wireless terminal at the RAN node, wherein the uplink data is associated with the connection resume request message; and
transmitting (1317) a connection release message to the wireless terminal after receiving the uplink data responsive to the release information for the wireless terminal and determining the state of a reachability request parameter at the RAN node,
wherein responsive to the state of the reachability request parameter at the RAN node having a first state, instructing the RAN node to not immediately transmit a connection release message to release and/or suspend the connection with the wireless terminal.

2. The method of Embodiment 1, wherein the state of the reachability request parameter at the RAN node corresponds to preceding/pending/waiting mobile terminated wireless terminal data and/or signaling procedures.

3. The method of any of Embodiments 1-2, wherein responsive to the state of the reachability request parameter at the RAN node having a second state that is different than the first state, instructing the RAN node to immediately transmit a connection release message to release and/or suspend the connection with the wireless terminal.

4. The method of any of Embodiments 1-3, wherein responsive to the state of the reachability request parameter at the RAN node having a second state that is different than the first state, the connection release message is transmitted responsive to the release information without waiting for expiration of any timer after receiving the uplink data.

5. The method of any of Embodiments 1 further comprising:
transmitting (1311) a connection resume response message to the wireless terminal in response to receiving the connection resume request message and determining the state of the reachability request parameter at the RAN node;
wherein the state of the reachability request parameter at the RAN node indicates preceding/pending/waiting mobile terminated wireless terminal data and/or signaling procedures.

6. The method of Embodiment 5, wherein the connection resume response message is a Radio Resource Control, RRC, resume message.

7. The method of any of Embodiments 1-6, wherein providing the release information comprises receiving a single packet indication from the wireless terminal, and wherein transmitting the connection release message comprises transmitting the connection release message responsive to the single packet indication and to the state of the reachability request parameter at the RAN node.

8. The method of Embodiment 7, wherein the single packet indication is received with the connection resume request message.

9. The method of Embodiment 8, wherein the uplink data is included with the connection resume request message.

10. The method of any of Embodiments 8-9, wherein the connection resume request message includes an early data transmission indication.

11. The method of any of Embodiments 8-10, wherein providing the release information comprises receiving a single packet indication from the wireless terminal and determining that the state of the reachability request parameter at the RAN node has the first state, and wherein transmitting the connection release message comprises transmitting the connection release message responsive to the single packet indication.

12. The method of Embodiment 11, wherein the single packet indication is received with the connection resume request message.

13. The method of any of Embodiments 8-12, wherein the connection release message includes downlink data for the wireless terminal.

14. The method of Embodiment 13, wherein the downlink data is included as a parameter of the connection release message and/or as a parameter in a protocol layer used to convey the connection release message.

15. The method of any of Embodiments 8-14, wherein the uplink data is included as a parameter of the resume request message and/or as a parameter in a protocol layer used to convey the resume request message.

16. The method of any of Embodiments 1-4, further comprising:
 receiving (1501) a notification from an access and mobility management function that includes information corresponding to wireless terminal context in the RAN node; and
 setting (1503) the state of the reachability request parameter at the RAN node.

17. The method of any of Embodiments 1-4, wherein the wireless device comprises an idle state, the method further comprising:
 receiving a notification from an access and mobility management function that includes the reachability request parameter at the RAN node; and
 setting the state of the reachability request parameter at the RAN node.

18. The method of any of claims 1-4, wherein responsive to the mobile terminal being unreachable by the RAN node, the method further comprises scheduling (1601) a RAN paging event and setting (1603) the state of the reachability request parameter at the RAN node to indicate that a notification to an access and mobility function will be performed at a next availability of the wireless device.

19. The method of any of Embodiments 1~4 further comprising:
 transmitting (1315) downlink data to the wireless terminal after receiving the uplink data;
 wherein the connection release message is transmitted after transmitting the downlink data responsive to the release information for the wireless terminal.

20. The method of Embodiment 19, wherein the connection release message is transmitted responsive to the release information without waiting for expiration of any timer after transmitting the downlink data.

21. The method of any of Embodiments 19-20, wherein providing the release information comprises receiving a dual packet indication from the wireless terminal, and wherein transmitting the connection release message comprises transmitting the connection release message responsive to the dual packet indication.

22. The method of Embodiment 21, wherein the dual packet indication is received with the connection resume request message.

23. The method of any of Embodiments 1-4, wherein downlink data is included with the connection release message.

24. The method of Embodiment 23, wherein the connection resume request message includes an early data transmission indication.

25. The method of any of Embodiments 19-20, wherein the wherein the uplink data is included in the connection resume request message.

26. The method of any of Embodiments 23-25, wherein providing the release information comprises receiving a dual packet indication from the wireless terminal, and wherein transmitting the connection release message comprises transmitting the connection release message responsive to the dual packet indication.

27. The method of any of Embodiments 1-4, further comprising:
 detecting (1701) RRC signaling related to the wireless device that has a context in the RAN node that includes the reachability request parameter for the wireless terminal; and
 responsive to detecting the RRC signaling, sending (1703) a wireless device notification that clears the state of the reachability request parameter.

28. The method of any of Embodiments 1-4, wherein the wireless device is in a connection management idle mode with suspended AS state, and
 wherein the method further comprises receiving (1801) a request from an access and mobility function to report RRC state information.

29. The method of Embodiment 1, the method further comprising:
 receiving (2101) a wireless device state transition notification message request that identifies the wireless device and that comprises a reporting type;
 setting (2103) the state of the reachability request parameter for the wireless device; and
 transmitting (2105) a wireless device notification message to an access and mobility function, the wireless device notification message comprising information corresponding to a current RRC state of the wireless device.

30. The method of Embodiment 29, the method further comprising:
 receiving (2107) a subsequent wireless device state transition notification message request that identifies the wireless device and that comprises the reporting type; and
 transmitting (2109) a subsequent wireless device notification message to an access and mobility function, the wireless device notification message comprising information corresponding to the current RRC state of the wireless device.

31. The method of any of Embodiments 29-30, the method further comprising:
 receiving (2001) a cancel wireless device state notification message; and
 responsive to receiving the cancel wireless device state notification message, terminating (2003) notifications corresponding to the wireless device.

32. The method of Embodiment 1, wherein the wireless device is in a connection management idle mode with suspended AS state, and
 wherein the method further comprises receiving (1901) a request to report when the wireless terminal becomes reachable by the RAN node.

33. The method of Embodiment 1, the method further comprising:
 receiving (1401) a wireless device reachability request message that includes the reachability request parameter at the RAN node and an identification of the wireless device that corresponds to the request message;
 transmitting (1403) a wireless device reachability response to an access and mobility function; and responsive to the wireless device becoming reachable, transmitting (1405) a notification message to the access and mobility function.

34. The method of Embodiment 33, wherein the wireless device becoming reachable comprises receiving an RRC signal from the wireless device and/or when a predetermined time of reachability occurs.

35. The method of any of Embodiments 1-34 further comprising:
    receiving (1301) a random access preamble message from the wireless terminal for a random access procedure; and
    transmitting (1303) a random access response message to the wireless terminal for the random access procedure responsive to receiving the random access preamble message from the wireless terminal,
    wherein the connection resume request message is a connection resume request message of the random access procedure that is received after transmitting the random access response.

36. The method of any of Embodiments 1-35, wherein the connection resume request message is a Radio Resource Control, RRC, connection resume request message.

37. The method of any of Embodiments 1-36, wherein the connection release message comprises a Radio Resource Control, RRC, connection release message.

38. The method of Embodiment 37, wherein the RRC connection release message includes a suspend indication, and
    wherein the state of the reachability request parameter at the RAN node is set to cause a message to be transmitted to an access and mobility function responsive to the wireless terminal becoming reachable.

39. The method of any of Embodiments 1-38, wherein providing the release information comprises obtaining the release information from a core network node of the wireless communication network.

40. The method of any of Embodiments 1-39, wherein the release information comprises information to release a Radio Resource Control, RRC, connection based on at least one of a traffic pattern, a traffic profile, release assistance information, and/or a release assistance indicator.

41. The method of any of Embodiments 1-40, wherein the uplink data is received from the wireless terminal at the RAN node after providing the release information for the wireless terminal at the RAN node.

42. A Radio Access Network, RAN, node (200) of a wireless communication network, wherein the RAN node is adapted to perform according to any of Embodiments 1-41.

43. A Radio Access Network, RAN, node (200) of a wireless communication network, the RAN node comprising:
    a processor (206); and
    memory (208) coupled with the processor, wherein the memory includes instructions that when executed by the processor causes the RAN node to perform operations according to any of Embodiments 1-43.

44. A computer program product, comprising:
    a non-transitory computer readable storage medium comprising computer readable program code embodied in the medium that when executed by a processor (206) of a radio access network, RAN, node (200) causes the RAN node to perform operations according to any of Embodiments 1-43.

Explanations for abbreviations from the above disclosure are provided below.

Abbreviation Explanation

| Abbreviation | Explanation |
| --- | --- |
| AMF | Access and Mobility Function |
| AS | Application Server |
| AS | Access Stratum |
| SCS | Service Capability Server (a type of AS defined in TS 23.682, Reference [5]) |
| CIoT | Cellular Internet of Things |
| EDT | Early Data Transmission (to "piggy back" user data in the RRC connection establishment signaling) |
| IoT | Internet of Things |
| RRC | Radio Resource Control |
| DL | Down Link |
| UL | Up Link |
| MO | Mobile Originated |
| MT | Mobile Terminated |
| NG | New Radio |
| RAI | Release Assistance Information/Indication/Indicator |
| RAN | Radio Access Network |
| RRC | Radio Resource Control |
| UE | User Equipment i.e. "device" or "wireless device" |
| UP | User Plane |
| CP | Control Plane |

Citations for references from the above disclosure are provided below.

Reference [1]; 3GPP TR 23.724 V1.0.0 (2018-07), Technical Specification Group Services and System Aspects; Study on Cellular IoT support and evolution for the 5G System (Release 16)

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method of operating a radio access network RAN; node of a wireless communication network, the method comprising:
   receiving a connection resume request message from a wireless terminal at the RAN node instructing the RAN node to establish a connection with the wireless terminal;
   providing release information for the wireless terminal at the RAN node;
   determining a state of a reachability request parameter at the RAN node;
   receiving uplink data from the wireless terminal at the RAN node, wherein the uplink data is associated with the connection resume request message; and
   transmitting a connection release message to the wireless terminal after receiving the uplink data responsive to the release information for the wireless terminal and determining the state of a reachability request parameter at the RAN node,
   wherein responsive to the state of the reachability request parameter at the RAN node having a first state, instructing the RAN node to not immediately transmit a connection release message to release or suspend the connection with the wireless terminal.

2. The method of any one of claim 1, wherein responsive to the state of the reachability request parameter at the RAN node having a second state that is different than the first state, instructing the RAN node to immediately transmit a connection release message to release or suspend the connection with the wireless terminal.

3. The method of claim 1 further comprising: transmitting (1311) a connection resume response message to the wireless terminal in response to receiving the connection resume request message and determining the state of the reachability request parameter at the RAN node; wherein the state of the reachability request parameter at the RAN node indicates one of preceding, pending, or waiting mobile terminated wireless terminal data or signaling procedures.

4. The method of claim 1, further comprising:
receiving a notification from an access and mobility management function that includes information corresponding to wireless terminal context in the RAN node; and
setting the state of the reachability request parameter at the RAN node.

5. The method of claim 1, wherein the wireless device comprises an idle state, the method further comprising:
receiving a notification from an access and mobility management function that includes the reachability request parameter at the RAN node; and
setting the state of the reachability request parameter at the RAN node.

6. The method of claim 1, wherein responsive to the mobile terminal being unreachable by the RAN node, the method further comprises scheduling a RAN paging event and setting the state of the reachability request parameter at the RAN node to indicate that a notification to an access and mobility function will be performed at a next availability of the wireless device.

7. The method of claim 1, further comprising:
transmitting downlink data to the wireless terminal after receiving the uplink data;
wherein the connection release message is transmitted after transmitting the downlink data responsive to the release information for the wireless terminal.

8. The method of claim 7, wherein providing the release information comprises receiving a dual packet indication from the wireless terminal, and wherein transmitting the connection release message comprises transmitting the connection release message responsive to the dual packet indication.

9. The method of claim 1, further comprising:
detecting RRC signaling related to the wireless device that has a context in the RAN node that includes the reachability request parameter for the wireless terminal; and
responsive to detecting the RRC signaling, sending a wireless device notification that clears the state of the reachability request parameter.

10. The method of claim 1, wherein the wireless device is in a connection management idle mode with suspended Access Stratum (AS) state, and wherein the method further comprises receiving a request from an access and mobility function to report RRC state information.

11. The method of claim 1, the method further comprising:
receiving a wireless device state transition notification message request that identifies the wireless device and that comprises a reporting type;
setting the state of the reachability request parameter for the wireless device; and
transmitting a wireless device notification message to an access and mobility function, the wireless device notification message comprising information corresponding to a current RRC state of the wireless device.

12. The method of claim 11, the method further comprising:
receiving a subsequent wireless device state transition notification message request that identifies the wireless device and that comprises the reporting type; and
transmitting a subsequent wireless device notification message to an access and mobility function, the wireless device notification message comprising information corresponding to the current RRC state of the wireless device.

13. The method of one any of claim 11, the method further comprising:
receiving a cancel wireless device state notification message; and
responsive to receiving the cancel wireless device state notification message, terminating notifications corresponding to the wireless device.

14. The method of claim 1, wherein the wireless device is in a connection management idle mode with suspended AS state, and
wherein the method further comprises receiving a request to report when the wireless terminal becomes reachable by the RAN node.

15. The method of claim 1, the method further comprising:
receiving a wireless device reachability request message that includes the reachability request parameter at the RAN node and an identification of the wireless device that corresponds to the request message;
transmitting a wireless device reachability response to an access and mobility function; and
responsive to the wireless device becoming reachable, transmitting a notification message to the access and mobility function.

16. The method of claim 1 further comprising:
receiving a random access preamble message from the wireless terminal for a random access procedure; and
transmitting a random access response message to the wireless terminal for the random access procedure responsive to receiving the random access preamble message from the wireless terminal,
wherein the connection resume request message is a connection resume request message of the random access procedure that is received after transmitting the random access response.

* * * * *